(12) United States Patent
Perkin

(10) Patent No.: US 12,312,778 B2
(45) Date of Patent: May 27, 2025

(54) ATMOSPHERIC WATER HARVESTING DEVICE AND METHOD

(71) Applicant: Ahbstra Engineering Ltd, London (GB)

(72) Inventor: Richard Perkin, Devon (GB)

(73) Assignee: Ahbstra Engineering Ltd (GB)

( * ) Notice: Subject to any disclaimer, the term of this patent is extended or adjusted under 35 U.S.C. 154(b) by 451 days.

(21) Appl. No.: 17/910,811

(22) PCT Filed: Mar. 10, 2021

(86) PCT No.: PCT/GB2021/050599
§ 371 (c)(1),
(2) Date: Sep. 10, 2022

(87) PCT Pub. No.: WO2021/181097
PCT Pub. Date: Sep. 16, 2021

(65) Prior Publication Data
US 2023/0228066 A1 Jul. 20, 2023

(30) Foreign Application Priority Data
Mar. 10, 2020 (GB) .................................... 2003474

(51) Int. Cl.
*E03B 3/28* (2006.01)
*B01D 53/06* (2006.01)
*B01D 53/26* (2006.01)

(52) U.S. Cl.
CPC ............... *E03B 3/28* (2013.01); *B01D 53/06* (2013.01); *B01D 53/261* (2013.01); *B01D 2257/80* (2013.01)

(58) Field of Classification Search
None
See application file for complete search history.

(56) References Cited

U.S. PATENT DOCUMENTS 4,595,575 A * 6/1986 Oeste ...................... B01J 20/20
95/107
5,632,802 A 5/1997 Grgich
(Continued)

FOREIGN PATENT DOCUMENTS

| WO | 2016081863 A1 | 5/2016 |
| WO | 2016187709 A1 | 12/2016 |
| WO | 2019152962 A2 | 8/2019 |

OTHER PUBLICATIONS

UAE Search and Examination Report, App. No. P6001840/2022, dated Apr. 25, 2024.

*Primary Examiner* — Gabriel E Gitman
(74) *Attorney, Agent, or Firm* — Fishman Stewart PLLC

(57) ABSTRACT

A water harvesting unit may include a chamber and a vessel. The chamber may include a first plenum space and a second plenum space located on either side of a partition member. The vessel may be supported for rotation within the chamber. The vessel may include a base and a plurality of sidewalls. The plurality of sidewalls may extend from the base to a vessel opening. The base may be substantially fluid impermeable and at least a portion of the plurality of sidewalls may be fluid permeable. The base and a majority of the plurality of sidewalls of the vessel may be disposed in the first plenum space. The vessel opening may open to the second plenum space via an opening in the partition member.

20 Claims, 16 Drawing Sheets

(56) References Cited

U.S. PATENT DOCUMENTS

2004/0244398 A1 12/2004 Radermacher
2007/0028769 A1 2/2007 Eplee
2018/0171604 A1 6/2018 Kim

* cited by examiner

ATMOSPHERIC WATER HARVESTING DEVICE AND METHOD

CROSS-REFERENCE TO RELATED APPLICATIONS

This application claims priority to International Patent Application No. PCT/GB2021/050599, filed Mar. 10, 2021, and Great Britain Patent Application No. GB2003474.0, filed Mar. 10, 2020, the contents of both of which are hereby incorporated by reference in their entirety.

TECHNICAL FIELD

The present disclosure relates to an atmospheric water harvesting device and method. Specifically, the present disclosure relates to a device and method for atmospheric water harvesting using a desiccant material.

BACKGROUND

The demand for potable water in arid regions is hard to satisfy due to the lack of natural water reservoirs such as those found in more temperate regions. Mechanical systems which harvest water from the atmosphere are known. Such systems typically use a mechanically-cooled surface to condense water vapour from the air. However, such mechanical systems are energy intensive and inefficient.

Dehumidification systems which use adsorbent materials such as silica are also known. In such systems, atmospheric water is harvested by using a desiccant to adsorb water from the atmosphere before desorption/regeneration of the desiccant by heating. The desorption/regeneration of the desiccant by heating is an energy intensive process dictated predominantly by the latent heat of vaporisation of water. These systems are therefore not necessarily any more energy efficient than mechanical atmospheric water harvesting systems.

New types of atmospheric harvesting system are beginning to emerge that use Metal Organic Framework (MOF) materials as the desiccant. MOF materials are able to adsorb water molecules at very low levels of relative humidity in the air, and are also able to release the bound water molecules at temperatures significantly lower than those required for other desiccant materials, such as silica, that have traditionally been used in dehumidification equipment. Some MOF materials can be desorbed/regenerated using heat sources that would typically be considered as "low grade heat" such as waste heat from manufacturing processes and power generation, geothermal heat, solar heat or any combination of renewable or non-renewable heat sources. Example MOF atmospheric water harvesting systems are disclosed in US2018/171604 and WO2019/152962.

The system described hereinbelow provides improvements over known atmospheric water harvesting systems.

SUMMARY

The present invention provides a water harvesting unit comprising: a chamber comprising a first plenum space and a second plenum space located on either side of a partition member; a vessel supported for rotation within the chamber, wherein the vessel comprises a base and sidewalls, wherein the sidewalls extend from the base to a vessel opening, and wherein the base is substantially fluid impermeable and at least a portion of the sidewalls are fluid permeable, wherein the base and the majority of the sidewalls of the vessel are located in the first plenum space, and wherein the vessel opening is open to the second plenum space via an opening in the partition member.

The water harvesting unit of the present invention is advantageous as it allows for rotation of the vessel during use. This, in turn, allows for the formation of an annulus of particulate material in use when the vessel is rotated.

Optionally a charge of particulate desiccant material may be located in the vessel.

The fluid permeable portion of the sidewalls may optionally comprise an outer layer and an inner layer, wherein the outer layer comprises a substantially rigid foraminous material, and wherein the inner layer comprises a rigid or flexible foraminous material. This allows the pressure drop, at a specific flow rate, across the fluid permeable portion of the sidewalls to be tuned by selection of the hole size and distribution in each foraminous material layer. The inner layer may have smaller holes that the outer later to prevent escape of fine particles of desiccant material. The inner layer may be replaceable.

The sidewalls of the vessel may comprise a first portion proximate the base and a second portion proximate the vessel opening, wherein the first portion of the sidewalls are fluid permeable, and wherein the second portion of the sidewalls are substantially fluid impermeable.

Optionally the first portion of the sidewalls are frustoconical diverging from the base of the vessel towards the second portion of the sidewalls. This helps to promote the formation of an annulus of particulate material having a consistent depth over the height of the first wall portion. This, in turn, helps to ensure consistent pressure drop across the annulus of particulate material thus prevent jetting of the airflow which reduces contact with the particulate material and risks entrainment of the particulate material in the airflow.

The second portion of the sidewalls are optionally frustoconical converging towards the vessel opening. This helps to prevent loss of the particulate material since the cross-sectional area of the vessel perpendicular to the air flow direction increases with increasing distance from the sidewalls. This causes the airflow to slow down before reaching the vessel opening allowing any entrained particulate material to drop out of the airflow more easily.

The base of the vessel may be conical or frustoconical diverging towards the sidewalls. This also helps to prevent loss of the particulate material since the cross-sectional area of the vessel perpendicular to the air flow direction increases with increasing distance from the sidewalls.

The water harvesting unit may optionally comprise at least one air funnel configured to direct air towards the fluid permeable portion of the sidewalls to improve airflow and pressure drop. The at least one air funnel may be configured to cover one quarter of the fluid permeable portion of the sidewalls. Optionally, four air funnels may be provided.

Optionally the water harvesting unit may comprise a plurality of vessels supported for rotation in the chamber. This improves efficiency of the water harvesting as water can be adsorbed/desorbed using more than one vessel at the same time in the same air supply.

The chamber may optionally comprise a plurality of second plenum spaces and a corresponding plurality of partition members, wherein each second plenum space is open to the vessel openings of two or more vessels via openings in the respective partition members. This allows for multiple configurations of water harvesting unit to suit specific space configurations and limitations.

The base and majority of the sidewalls of each vessel may be located in a common first plenum space to provide a simpler configuration.

Optionally, at least some of the vessels are offset from one another in a direction parallel to an axis of rotation of the vessels.

At least some of the vessels may optionally share a common axis of rotation so that some vessels are stacked in a column.

The water harvesting unit may comprise a drive assembly configured to provide rotational drive to a plurality of vessels in use. Alternatively, the drive assembly may be external to the water harvesting unit.

Optionally the drive assembly may be configured to provide rotational drive to each vessel in use so that only one drive assembly is required.

In another aspect, the present invention provides a cassette for a water harvesting unit, the cassette comprising: an enclosure defining a plenum space, the enclosure comprising a boundary wall and a partition wall, wherein the partition wall comprises one or more partition wall openings, and wherein the boundary wall defines an airflow opening; and one or more vessels supported for rotation with respect to the enclosure, wherein each vessel comprises a base and sidewalls, wherein the sidewalls extend from the base to a vessel opening, and wherein the base is substantially fluid impermeable and at least a portion of the sidewalls are fluid permeable, wherein each vessel opening is rotatably received within a partition wall opening.

The cassette is advantageous as it facilitates replacement/exchange of vessels within a water harvesting system.

Optionally the cassette comprises a drive assembly configured to provide rotational drive to one or more vessels in use. Alternatively, the drive assembly may be external to the cassette.

In a further aspect, the present invention provides a chamber configured to receive one or more cassettes as described above, wherein the chamber defines a first plenum space within which the base and the majority of the sidewalls of the one or more of vessels of the or each cassette are located in use.

In a still further aspect, the present invention provides a water harvesting unit comprising a chamber as described above and one or more cassettes as described above.

Optionally, the water harvesting unit is located in a pressurisable vessel which may comprise a sealable door. It is beneficial to locate the water harvesting unit in a vessel which may be pressurised as this allows the water vapour pressure to be isolated from the environment and allows the pressure to be raised thereby increasing the dewpoint temperature.

In yet another aspect, the present invention provides a water harvesting system comprising: one or more water harvesting units as described above, an atmospheric air system comprising an air mover configured to supply a flow of atmospheric air to the or each first plenum space in an adsorption mode of operation; a desorption air system comprising an air mover configured to supply a flow of desorption air to the or each first plenum space in a desorption mode of operation; and a heat exchanger configured to cool the flow of desorption air leaving the water harvesting unit in the desorption mode of operation so that, in use, at least some of the water vapour contained in the flow of desorption air condenses within the heat exchanger.

Optionally the water harvesting system comprises an exhaust line configured to convey atmospheric air away from the one or more water harvesting units, wherein the exhaust line is configured to convey at least a part of the atmospheric air flow to the heat exchanger, in use, for use as a coolant. This provides efficient use of the available heat/energy within the system.

The atmospheric air system may optionally comprise a chiller located upstream of the one or more water harvesting units with respect to the atmospheric air flow direction in use.

The desorption air system may comprise a closed loop such that, in use, the desorption air flow passes through the one or more water harvesting units and the heat exchanger before being re-circulated to the or each first plenum space of the or each water harvesting unit.

Optionally the desorption air system may comprise a recuperative heat exchanger configured to facilitate heat exchange between the desorption air flow exiting the water harvesting unit and the desorption air flow returning to the water harvesting unit. This provides an efficient use of airflows within the system.

The desorption air system may optionally comprise a heater located upstream of the water harvesting unit, and downstream of the recuperative heat exchanger, if present, with respect to the direction of desorption air flow in use.

The desorption air system may comprise a supplementary chiller located downstream of the heat exchanger, and upstream of the recuperative heat exchanger if present, with respect to the direction of desorption air flow in use.

Optionally the water harvesting system may comprise a first water harvesting bank comprising one or more water harvesting units and a second water harvesting bank comprising one or more water harvesting units, wherein the system is configured so that, in use, when one of the first or second water harvesting banks is operating in an adsorption mode of operation, the other of the water harvesting banks is able to operate in a desorption mode of operation. This allows for substantially continuous water production. It should be noted that the first water harvesting bank may comprise a different number of water harvesting units, or vessels within units, to the second water harvesting bank.

Optionally, the water harvesting system is located in a pressurisable vessel which may comprise a sealable door. It is beneficial to locate the water harvesting system in a vessel which may be pressurised as this allows the water vapour pressure to be isolated from the environment and allows the pressure to be raised thereby increasing the dewpoint temperature.

In a further aspect the present invention provides a method of harvesting water from atmospheric air, the method comprising: passing a flow of atmospheric air through a rotating vessel, wherein the vessel comprises a base and sidewalls, wherein the sidewalls extend from the base to a vessel opening, and wherein the base is substantially fluid impermeable and at least a portion of the sidewalls are fluid permeable, wherein the vessel contains a charge of particulate desiccant material, wherein passing the flow of atmospheric air through the rotating vessel comprises passing the flow through the sidewalls of the rotating vessel from the exterior of the vessel to the interior of the vessel, wherein the flow of atmospheric air exits the vessel via the vessel opening; stopping the flow of atmospheric air through the rotating vessel; passing a flow of desorption air through the rotating vessel, wherein passing the flow of desorption air through the rotating vessel comprises passing the flow through the sidewalls of the rotating vessel from the exterior of the vessel to the interior of the vessel, wherein the flow of desorption air exits the vessel via the vessel opening;

and cooling the flow of desorption air exiting the vessel to recover liquid water from the flow of desorption air.

Optionally, passing the flow of atmospheric air through the rotating vessel may comprise passing the flow of atmospheric air through the vessel for a first predetermined period of time, and wherein passing the flow of desorption air through the rotating vessel comprises passing the flow of desorption air through the vessel for a second predetermined period of time, wherein the first predetermined period of time and the second predetermined period of time may be equal.

The method of harvesting water from atmospheric air may optionally comprise altering the first and/or second predetermined period of time. This allows the cycle times of the adsorption and desorption modes of operation to be optimised depending on the prevalent use conditions.

The flow of atmospheric air may be chilled before passing through the vessel.

Optionally cooling the flow of desorption air comprises a first cooling step followed by a second further cooling step.

The flow of desorption air may optionally be heated before it is passed through the vessel.

The flow of desorption air may comprise a closed loop flow such that the flow of desorption air circulates around a closed loop.

Optionally the flow of desorption air exiting the vessel is used to heat the returning flow of desorption air before it re-enters the vessel.

The temperature and/or relative humidity of the circulating flow of desorption air may optionally be measured and the cooling of the circulating flow of desorption air may be prevented until the temperature and/or relative humidity have reached a predetermined value.

Optionally the method of harvesting water from atmospheric air comprises passing a flow of atmospheric air through a first rotating vessel at the same time as passing a flow of desorption air through a second rotating vessel.

The flow of atmospheric air exiting the first vessel may optionally be used to cool the flow of desorption air exiting the second vessel.

The method of harvesting water from atmospheric air may comprise: stopping the flow of atmospheric air through a first rotating vessel; stopping the flow of desorption air through a second rotating vessel; and passing a flow of atmospheric air through the second rotating vessel at the same time as passing a flow of desorption air through the first rotating vessel.

Optionally, the or each vessel is rotated at a speed sufficient to cause the particulate desiccant material to be urged outwardly from the axis of rotation by centrifugal force to form an annular body of desiccant particles adjacent to the sidewalls of the vessel; and the velocity of the flow of atmospheric air and the flow of desorption air is sufficient to cause the annular body of desiccant particles to form an at least partially fluidised bed.

BRIEF DESCRIPTION OF THE DRAWINGS

The present invention will now be described by way of non-limiting examples with reference to the following figures, in which:

FIG. 11b shows an alternative isometric view of the cassette of FIG. 11a;

DETAILED DESCRIPTION

Figure 1:
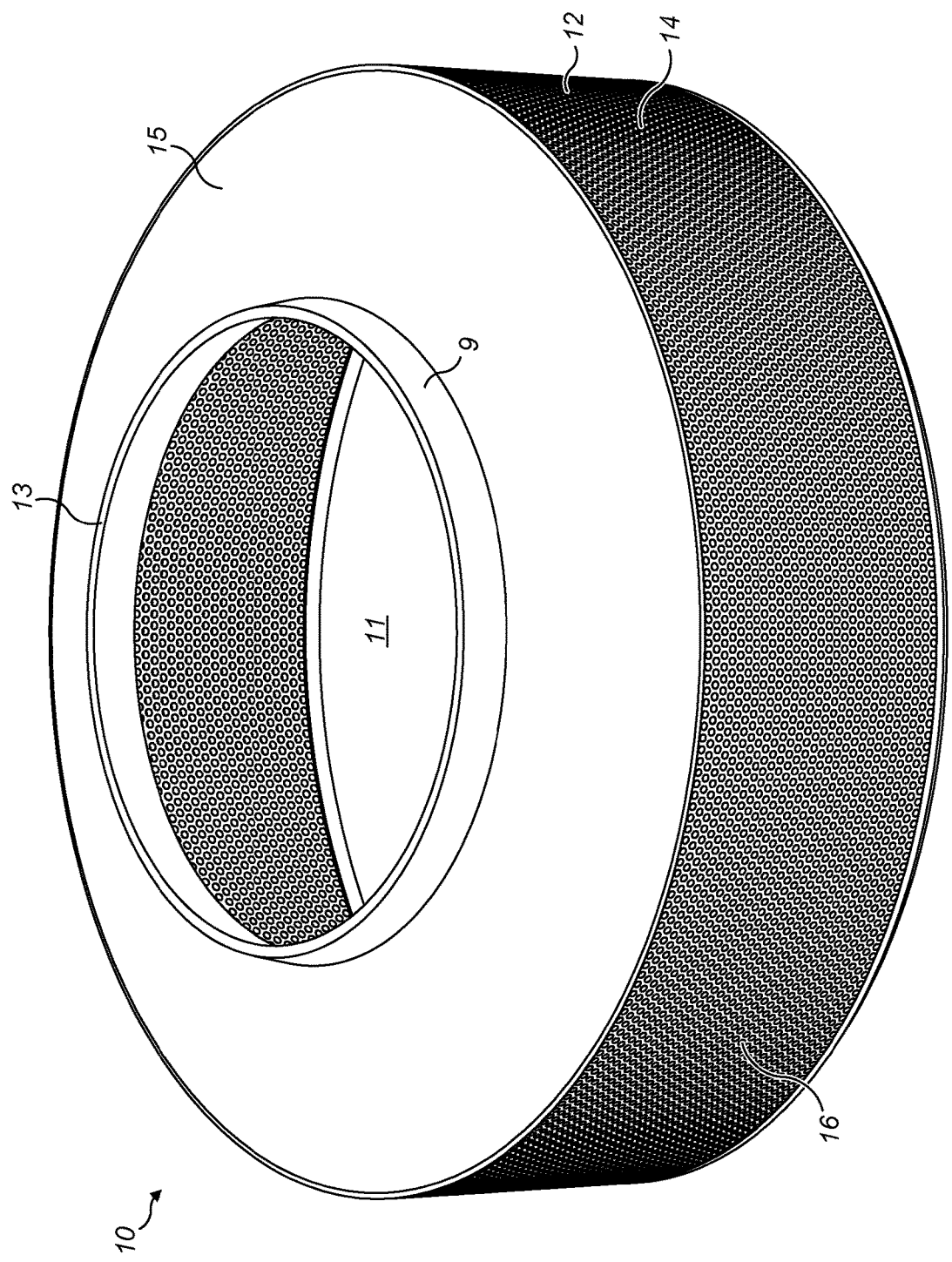
FIG. 1 shows an isometric view of a vessel for containing desiccant particles.
Figure 2:
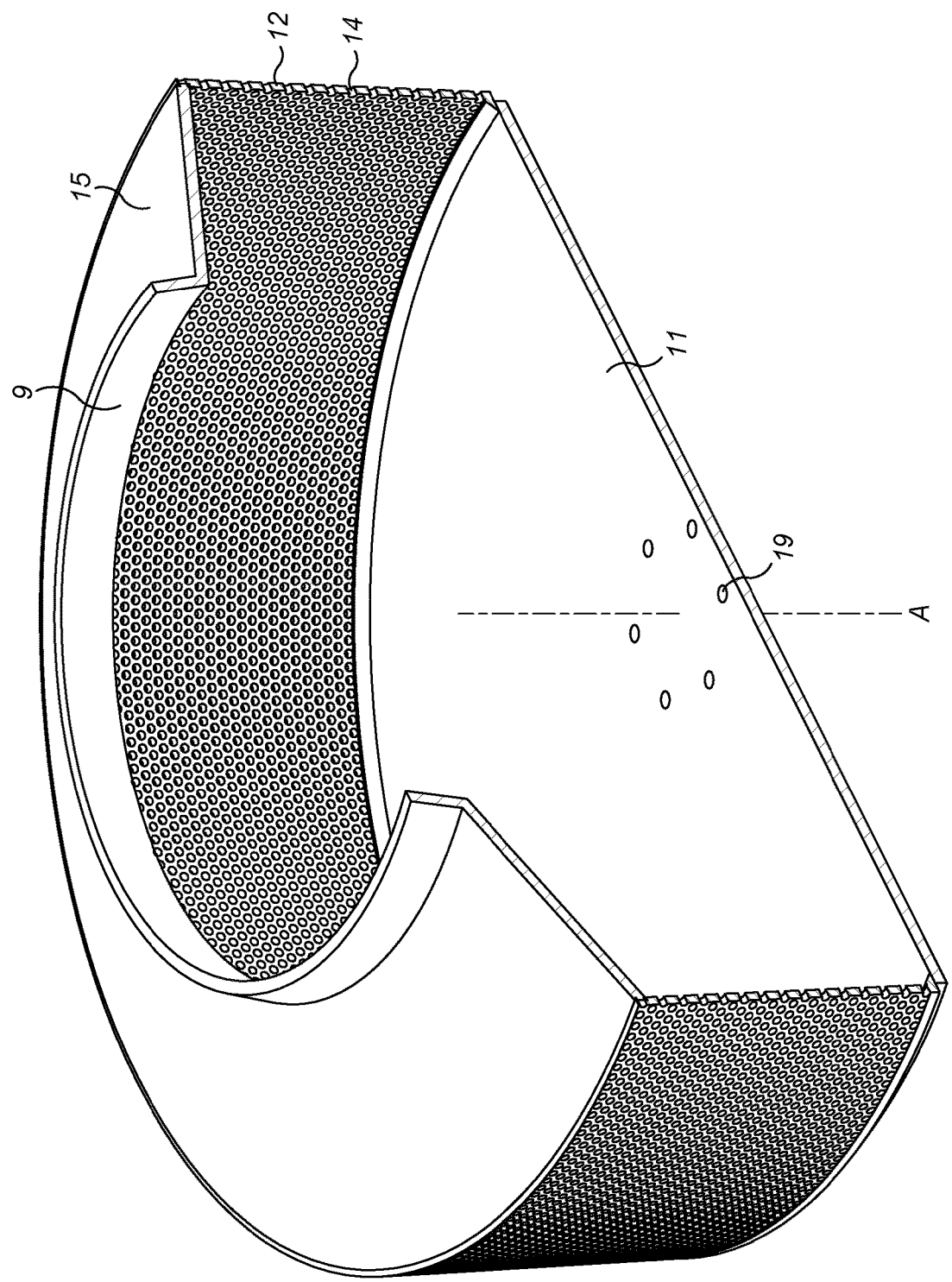
FIG. 2 shows an isometric sectional view of the vessel of FIG. 1.
Figure 4:
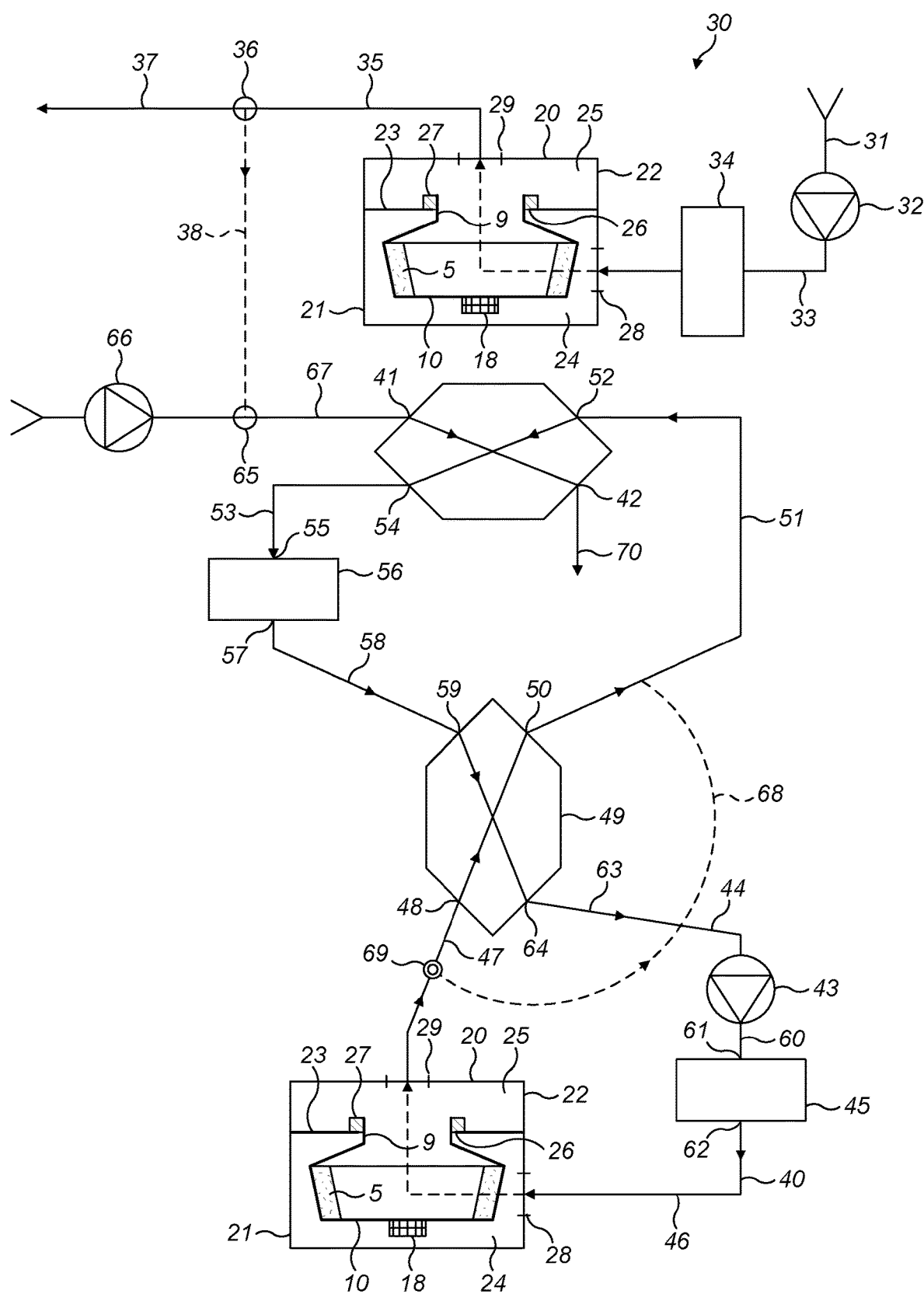
FIG. 4 shows a schematic diagram of an atmospheric air harvesting system comprising a water harvesting unit according to the present invention.

FIGS. 1 and 2 show an example of a vessel 10 for use in a water harvesting unit 20 (see FIG. 4). The vessel 10 is rotationally symmetrical about a central axis A and comprises a base 11 and sidewalls 12 which extend from the base 11 to a vessel opening 13. The base 11 and sidewalls 12 comprise a rigid plastics material such as acrylonitrile butadiene styrene (ABS) or polypropylene for example.

The sidewalls 12 comprise a first portion 14 proximate the base 11 and a second portion 15 proximate the opening 13. The first portion 14 is frustoconical in shape such that it diverges outwardly from the base 11 towards the second portion 15. The second portion 15 is also frustoconical in shape, converging inwardly from the first portion 14 towards the vessel opening 13. In this example the sidewalls 12 also comprise a lip 9 which is frustoconical in shape extending away from the base 11 and converging towards the central axis A.

The first portion 14 of the sidewalls 12 diverge away from the central axis A at a shallow angle. As will be descried in greater detail below, this helps to distribute a charge 4 of particulate desiccant material 5 (see FIG. 3) evenly over the first portion 14 of the sidewalls 12 in use. In the example shown in FIGS. 1 to 3, the first portion 14 of the sidewalls 12 diverge away from the central axis A at an angle of about 3°. However, it will be understood that the exact angle of divergence of the first portion 14 of the sidewalls 12 from the central axis A will depend on a number of design factors including type and particle size of desiccant, and operating speeds/temperature/location etc. The angle of divergence of the first portion 14 of the sidewalls 12 from the central axis A might typically be in the range 1° to 10°.

The second portion 15 of the sidewalls 12 converge towards the opening 13 at a shallow angle with respect to a plane perpendicular to the rotational axis A. This helps to retain the particulate desiccant material 5 within the vessel 10 in use and also helps to reduce the air velocity passing through the vessel 10 in use as will be described in greater detail below. In the example shown in FIGS. 1 to 3, the second portion 15 of the sidewalls 12 converge towards the opening 13 with respect to a plane perpendicular to the rotational axis A at an angle of about 7°. However, it will be understood that the exact angle of convergence of the second portion 15 of the sidewalls 12 will depend on a number of design factors including type and particle size of desiccant, and operating speeds/temperature/location etc. The angle of convergence of the second portion 15 of the sidewalls 12 might typically be in the range 1° to 10°.

The base 11, the second portion 15 of the sidewalls 12, and the lip 9 are fluid impermeable such that no air can pass through these portions of the vessel 10. In contrast to this, the first portion 14 of the sidewalls 12 comprises a plurality of holes 16 which pass through the depth of the sidewalls 12 such that the first portion 14 is foraminous and therefore fluid permeable. In the example shown, the holes 16 are about 1 mm in diameter and approximately 50% of the first portion 14 of the sidewalls 12 is perforated. It will be understood that any suitable hole diameter and percentage perforation may be used and that the above is given as an example only.

The inner surface of the first portion 14 of the sidewalls 12 is covered by a flexible porous woven material 17 (see FIG. 3) with an average pore size sufficiently small to prevent escape of the particulate desiccant material 5 through the sidewalls 12 of the vessel 10. Suitable example materials include nylon, polyester or polypropylene fibre mesh.

Figure 3:
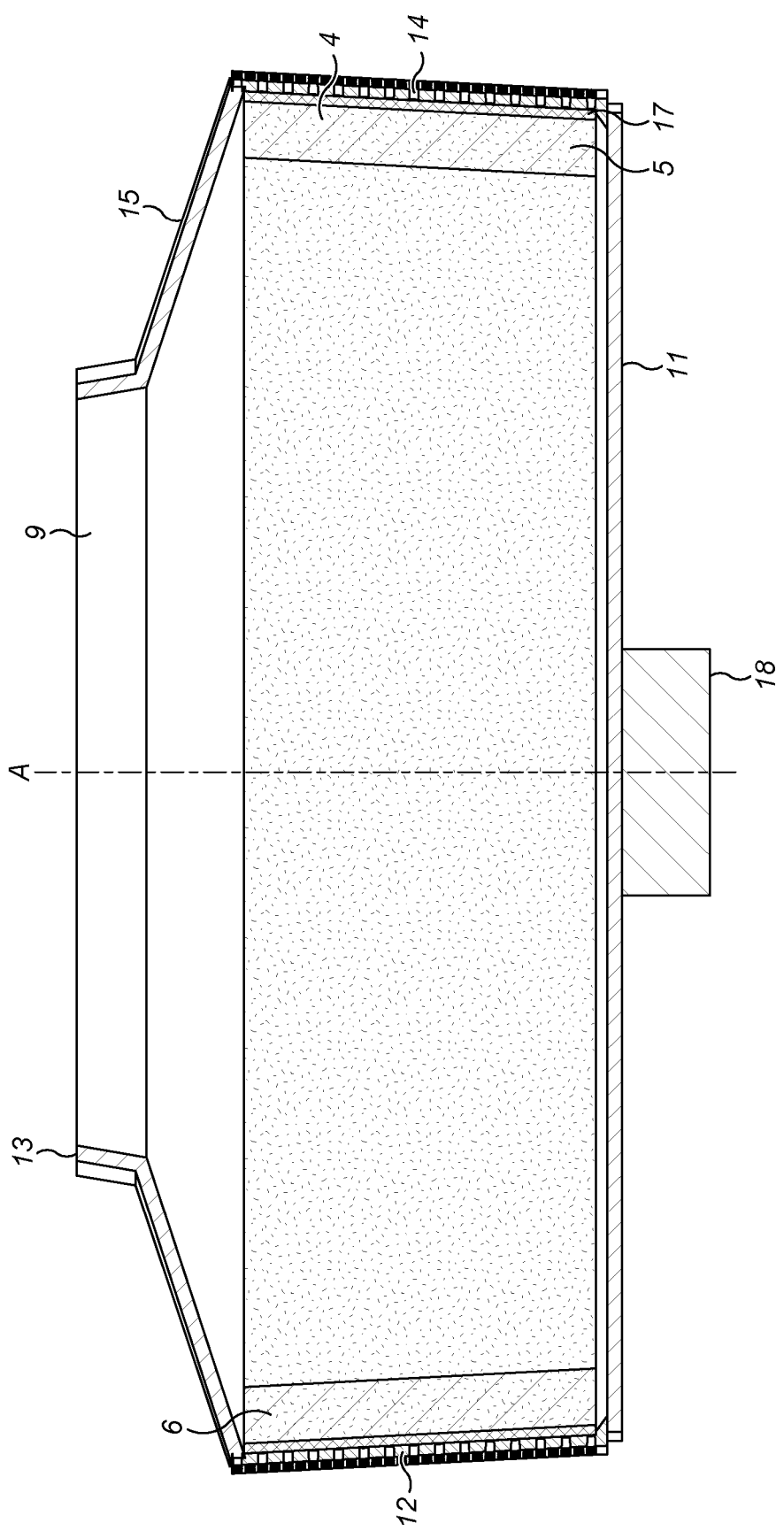
FIG. 3 shows a sectional side view of the vessel of FIG. 1 containing desiccant particles.

Referring now to FIGS. 2 and 3, the vessel 10 is connected to a hub 18 which is attached to the base 11 by fasteners (not shown) via fastening holes 19 (FIG. 2) in the base 11. The hub 18 provides a means of rotating the vessel 10.

When in use in a water harvesting system (described in detail below), the vessel 10 contains a charge 4 of particulate desiccant material 5. During an atmospheric water harvesting operation, the vessel 10 is rotated about its vertically orientated central axis A at a speed sufficient to cause the particulate desiccant material 5 to form an annulus 6 (see FIG. 3) of desiccant material 5 adjacent the first portion 14 of the sidewalls 12. The shallow outward slope of the first portion 14 of the sidewalls 12 helps to ensure that the depth of the annulus 6 of desiccant material 5 is substantially consistent over its height. This in turn helps to ensure that the pressure drop across the annulus 6 of desiccant material 5 in use is uniform over the height of the annulus 6.

FIG. 4 shows a schematic diagram of an atmospheric air harvesting system 30 comprising example water harvesting units 20. The water harvesting units 20 each comprise a chamber 21 having a boundary wall 22 and a partition member 23 which defines a first plenum space 24 located below the partition member 23, and a second plenum space 25 located above the partition member 23. The partition member 23 has an opening 26 within which is received the lip 9 of the vessel 10 supported by rotational bearings 27. Hence, the base 11 and the majority of the sidewalls 12 of the vessel 10 are located within the first plenum space 24, and the vessel opening 13 is open to the second plenum space 25.

A drive assembly (not shown) is provided to drive the rotation of the vessel 10 via the hub 18. The hub 18 may be driven by motor located within the chamber 21 or located outside the chamber 21 and connected to the hub 18 via a belt drive or similar.

The chamber 21 further comprises a first airflow opening 28 located in the boundary wall 22 proximate the first plenum space 24 and a second airflow opening 29 located in the boundary wall 22 proximate the second plenum space 25. The first and second airflow openings 28, 29 provide ingress and egress openings for the airflow in use (described below).

The water harvesting system 30 further comprises an atmospheric air system 31 for providing a flow of atmospheric air through the particulate desiccant material 5 so that water vapour in the atmospheric air may be adsorbed by the particulate desiccant material 5 in an adsorption mode of operation. The atmospheric air system 31 comprises a blower 32 located in an atmospheric air inlet line 33 upstream of a chiller 34. The atmospheric air inlet line 33 is connected to the first airflow opening 28 of the water harvesting unit 20.

The atmospheric air system 31 also comprises an atmospheric air exhaust line 35 connected to the second airflow opening 29 of the water harvesting unit 20. The exhaust line 35 comprises a valve 36 which is configured to divert some or all of the atmospheric air flow in the exhaust line 35 to the cold side inlet 41 of a counterflow heat exchanger 42 (described below) via a diversion section 38 of the exhaust line 35. Atmospheric air flow not diverted to the heat exchanger 42 is exhausted to atmosphere via a discharge section 37 of the exhaust line 35.

The water harvesting system 30 also comprises a desorption air system 40 for providing a flow of desorption air through the particulate desiccant material 5 in a desorption mode of operation so that water adsorbed by the particulate desiccant material 5 in the adsorption mode of operation may be desorbed and recovered. The desorption air system 40 comprises a blower 43 for circulating air around a closed loop desorption air line 44. Beginning with the air blower 43, the desorption air line 44 comprises a first section 60 connecting the outlet of the blower 43 to the inlet 61 of a heater 45 located downstream of the blower 43 relative to the direction of desorption air flow in use. A second section 46 of the line 44 connects the outlet 62 of the heater 45 to the first airflow opening 28 of the water harvesting unit 20, and a third section 47 of the line 44 connects the second airflow opening 29 of the water harvesting unit 20 to a hot side inlet 48 of a counterflow recuperative heat exchanger 49.

A fourth section 51 of the desorption air line 44 connects the cold side outlet 50 of the counterflow recuperative heat exchanger 49 to the hot side inlet 52 of the counterflow heat exchanger 42, a fifth section 53 of the desorption air line 44 then connects the cold side outlet 54 of the counterflow heat exchanger 42 to the inlet 55 of a chiller 56, a sixth section 58 of the desorption air line 44 connects the outlet 57 of the chiller 56 to the cold side inlet 59 of the counterflow recuperative heat exchanger 49, and finally a seventh section 63 of the desorption air line 44 connects the hot side outlet 64 of the counterflow recuperative heat exchanger 49 to the inlet of the blower 43.

The cold side inlet 41 of the counterflow heat exchanger 42 is connected to an inlet line 67 which comprises a blower 66 and a valve 65. The blower 66 is configured to supply atmospheric air to the counterflow heat exchanger 42. The valve 65 is configured to selectively allow only atmospheric air supplied by the blower 66, only exhaust atmospheric air from the diversion section 38 of the exhaust line 35, or a mixture of the atmospheric air supplied by the blower 66 and the exhaust atmospheric air from the diversion section 38 of the exhaust line 35 to enter the counterflow heat exchanger 42. In this way, the valves 36 and 65 can be used to control the operation of the counterflow heat exchanger 42 by varying the relative amounts of exhaust atmospheric air and atmospheric air that enter the counterflow heat exchanger 42. Atmospheric air leaving the counterflow heat exchanger 42 is exhausted back to atmosphere via vent 70.

In a preferred embodiment, the water harvesting system 30 comprises a plurality of water harvesting units 20 so that the adsorption mode of operation may be run with a first water harvesting unit 20 at the same time as the desorption mode of operation is being run with a second water harvesting unit 20. It will be clear to the skilled person that the lines and connections described above may be configured to supply one or more water harvesting units 20 by the use of suitable valves, conduit connections and controllers. Each water harvesting unit 20 may have its own dedicated atmospheric air system 31 and desorption air system 40. Alternatively, the water harvesting units 20 may be connectable to a common atmospheric air system 31 and to a common desorption air system 40 such that when one water harvesting unit (or units) 20 is connected to the atmospheric air system 31, the other water harvesting unit (or units) 20 is connected to the desorption air system 40.

In either case, in the adsorption mode of operation the vessel 10 is rotated as described above to form an annulus 6 of particulate desiccant material 5 adjacent the first portion 14 of the vessel's sidewalls 12, and the blower 32 is operated to supply air to the first airflow opening 28 of the water harvesting unit 20 via the chiller 34. Cold air from the chiller 34 enters the first plenum space 24 and passes into the vessel 10 through the first portion 14 of the sidewalls 12. The cold air passes through the sidewalls 12 in a predominantly radial direction at a speed sufficient to at least partially fluidise the annular bed 6 of particulate desiccant material 5 which is being forced outwardly by the centrifugal forces imparted on it by the rotation of the vessel 10. In this way, excellent contact is achieved between the atmospheric air flow and the particles of desiccant material 5 without entraining the particles in the airflow such that they are subsequently lost through the vessel opening 13 along with the atmospheric air flow. The atmospheric air flow exits the vessel 10 via the vessel opening 13 and then exits the atmospheric air system 31 via the second plenum space 25, the second airflow opening 29, and the exhaust line 35.

The frustoconical shape of the second portion 15 of the sidewalls 12 helps to prevent loss of the particulate desiccant material 5 since the cross-sectional area of the vessel 10 perpendicular to the air flow direction increases with increasing distance from the sidewalls 12. This causes the airflow to slow down before reaching the vessel opening 13 allowing any entrained particulate material 5 to drop out of the airflow more easily. This is true for both the adsorption and desorption modes of operation.

The adsorption mode of operation is continued until the charge 4 of particulate desiccant material 5 has either become saturated with water, or until it is otherwise determined that the adsorption mode of operation should come to an end. For example, it has been found in trails that the highest rate of water adsorption takes place in the first 10 minutes of operation and that continued operation after 10 minutes yields little benefit in terms of water adsorbed versus energy and time used.

When the adsorption mode of operation is deemed to be finished, the water harvesting unit is switched to the desorption mode of operation by connection to its own, or a common, desorption air system 40. As with the adsorption mode of operation, in the desorption mode of operation the vessel 10 is rotated to form an annulus 6 of particulate desiccant material 5 adjacent the first portion 14 of the vessel's sidewalls 12. The blower 43 of the desorption air system 40 is operated to supply air to the first airflow opening 28 of the water harvesting unit 20 via the heater 45. Hot air from the heater 45 enters the first plenum space 24 and passes into the vessel 10 through the first portion 14 of the sidewalls 12. The hot air passes through the sidewalls 12 in a predominantly radial direction at a speed sufficient to at least partially fluidise the annular bed 6 of particulate desiccant material 5 which is being forced outwardly by the centrifugal forces imparted on it by the rotation of the vessel 10. In this way, excellent contact is achieved between the desorption air flow and the particles of desiccant material 5 without entraining the particles in the airflow such that they are subsequently lost along with the desorption air flow.

The desorption air flow exits the vessel 10 via the second plenum space 25, the second airflow opening 29, and the third section 47 of the desorption air line 44. From there the desorption air flow passes through the recuperative counterflow heat exchanger 49 where it gives up some of its heat to the returning desorption air flow flowing in the other direction through the recuperative counterflow heat exchanger 49. The now slightly cooler desorption airflow passes along the fourth section 51 of the desorption air line 44 to the hot side inlet 52 of the counterflow heat exchanger 42 where it is cooled by the airflow supplied by the inlet line 67 flowing in the other direction through the counterflow heat exchanger 42. The cooling of the desorption air flow in the counterflow heat exchanger 42 is sufficient to bring the desorption air flow below its dew point temperature and consequently cause at least some of the water vapour in the desorption air flow to condense out. The condensed water is collected from the counterflow heat exchanger 42.

Upon leaving the counterflow heat exchanger 42, the desorption airflow passes along the fifth section 53 of the desorption air line 44 to the chiller 56 where it is further cooled and any remaining water is condensed from the desorption airflow and collected. The desorption air flow then passes along the sixth section 58 of the desorption air line 44 to the recuperative counterflow heat exchanger 49 where it is warmed by the desorption air flow leaving the water harvesting unit 20. Finally, the desorption air flow passes along the seventh section 63 of the desorption air line 44 and returns to the blower 43 to complete the closed loop.

The desorption mode of operation is continued until the charge 4 of particulate desiccant material 5 has either become dry, or until it is otherwise determined that the desorption mode of operation should come to an end. For example, it has been found in trails that the highest rate of water desorption takes place in the first 10 minutes of operation and that continued operation after 10 minutes yields little benefit in terms of water desorbed versus energy and time used. It is particularly important to balance the water yield rate versus the energy used in the desorption mode of operation as external sources of energy are used to operate the heater 45 and the chiller 56.

Optionally, a bypass line 68 may be provided to divert the air circulating in the desorption cycle around the recuperative counterflow heat exchanger 49 from before the hot side inlet 48 of the counterflow recuperative heat exchanger 49 to after the cold side outlet 50 of the recuperative heat exchanger 49. This allows at air temperature on the heat rejection side of the recuperative heat exchanger 49 to be controlled. A valve 69 located at the intersection section 47 of the line 44 and the bypass line 68 controls how much of the hot air leaving the water harvesting unit 20 enters the recuperative heat exchanger 49 and how much bypasses the recuperative heat exchanger 49 via the bypass line 68.

In some circumstances it may be desirable to circulate the desorption airflow around the closed loop of the desorption air line 44 for a period of time before the counterflow heat exchanger 42 is supplied with a cooling air flow from inlet line 67, and before the chiller 56 is operated. In this way, the desorption airflow may become laden with water vapour from the drying desiccant particles 5 before any cooling/evaporation operation takes place. This may help to improve the efficiency of the desorption operation since, as the dew point temperature of the circulating air flow rises, the airflow becomes more and more saturated with water. This in turn means that the circulating airflow requires less cooling to reach its dew point temperature thereby optimising the amount of water that can be recovered by the counterflow heat exchanger 42, and requiring less external energy input to the chiller 56. Preferably the cooling of the desorption airflow is introduced slowly, or in a stepwise manner, so as not to remove too much water from the circulating airflow and thereby decreasing the relative humidity of the airflow and lowering its dew point to a temperature below that which might be achieved in the counterflow heat exchanger 42.

If the water harvesting system is being operated in a hot environment, such as an arid zone, the outside air temperature may be 40° C. or more. In order to maximise the water that can be recovered in the counterflow heat exchanger 42 it is preferable that the circulating desorption airflow becomes saturated enough for the dew point temperature to rise to 40° C. (or more). Operating the desorption cycle with a dew point temperature as high as possible is also advantageous as, the less the circulating desorption airflow has to be cooled (for water release), the less it has to be heated by the heater 45 (for example) in order to desorb water vapour from the particulate desiccant material 5 in the desorption mode of operation.

It will be understood that in its simplest form, the second plenum space 25 of the water harvesting unit 20 may be a simple conduit leading from the opening(s) 13 of the vessel (s) 10 to transfer the air to the next stage in the adsorption/desorption operation.

A preferred material for the particulate desiccant material 5 is a MOF material such as aluminium fumarate. It has been found in tests that particulate MOF material, when used in the above described system, is able to be desorbed/regenerated at air temperatures as low as 55° C. thereby lending themselves to the use of "low grade heat" sources for the provision of heating power. This is beneficial from an environmental and efficiency standpoint.

In trials a 100 g charge 4 of particulate aluminium fumarate having an average particle size of 0.3 mm to 1 mm was used in a vessel 10 of approximately 190 mm diameter. In the adsorption mode of operation, the vessel 10 was rotated at about 200 rpm and an airflow rate of about 15 l/minute over the circumference of the vessel 10 was passed through the vessel 10. This produced an annular bed 6 of particulate desiccant material 5 with sufficient fluidisation. In the desorption mode of operation, the vessel 10 was rotated at about 120 rpm to 150 rpm and a desorption airflow rate of about 5 l/minute over the circumference of the vessel 10 was passed through the vessel 10. Again, this produced an annular bed 6 of particulate desiccant material 5 with sufficient fluidisation.

It will be understood that these are examples only and that may other suitable vessel dimensions, charge sizes, speeds and flow rates will exists depending on the exact parameters of operation and the type and particle size of desiccant used.

It is not efficient to overload the vessel 10 with a large charge 4 of particulate desiccant material 5 since the pressure drop across the annulus 6 of desiccant material 5 formed as the vessel 10 is rotated becomes too high and more power is required to fluidise the annular bed of particulate desiccant material 5.

It should be noted that the speed of rotation of the vessel 10 and the airflow rate may vary between the adsorption mode of operation and the desorption mode of operation depending on the specific parameters of the system. It should also be noted that the duration of the adsorption mode of operation need not match that of the desorption mode of operation and that either mode of operation may take longer to run than the other depending on the system parameters and location/conditions of operation.

Although the operation of the water harvesting system 30 has been described in relation to the particular layout and operation of the system of FIG. 4, it will be understood that many variations are possible. For example, the adsorption operation may be run without the use of chiller 34, and the desorption operation may be run without the recuperative counterflow heat exchanger 49 and/or chiller 56. In its most simple form, the desorption operation may only comprise passing a heated flow of atmospheric air through the water harvesting unit 20 and heat exchanger 42. It will also be understood that either of the counterflow heat exchangers 42, 49 could be substituted for parallel flow heat exchangers. The counterflow heat exchanger 42 could also be substituted for a chiller.

Figure 5:
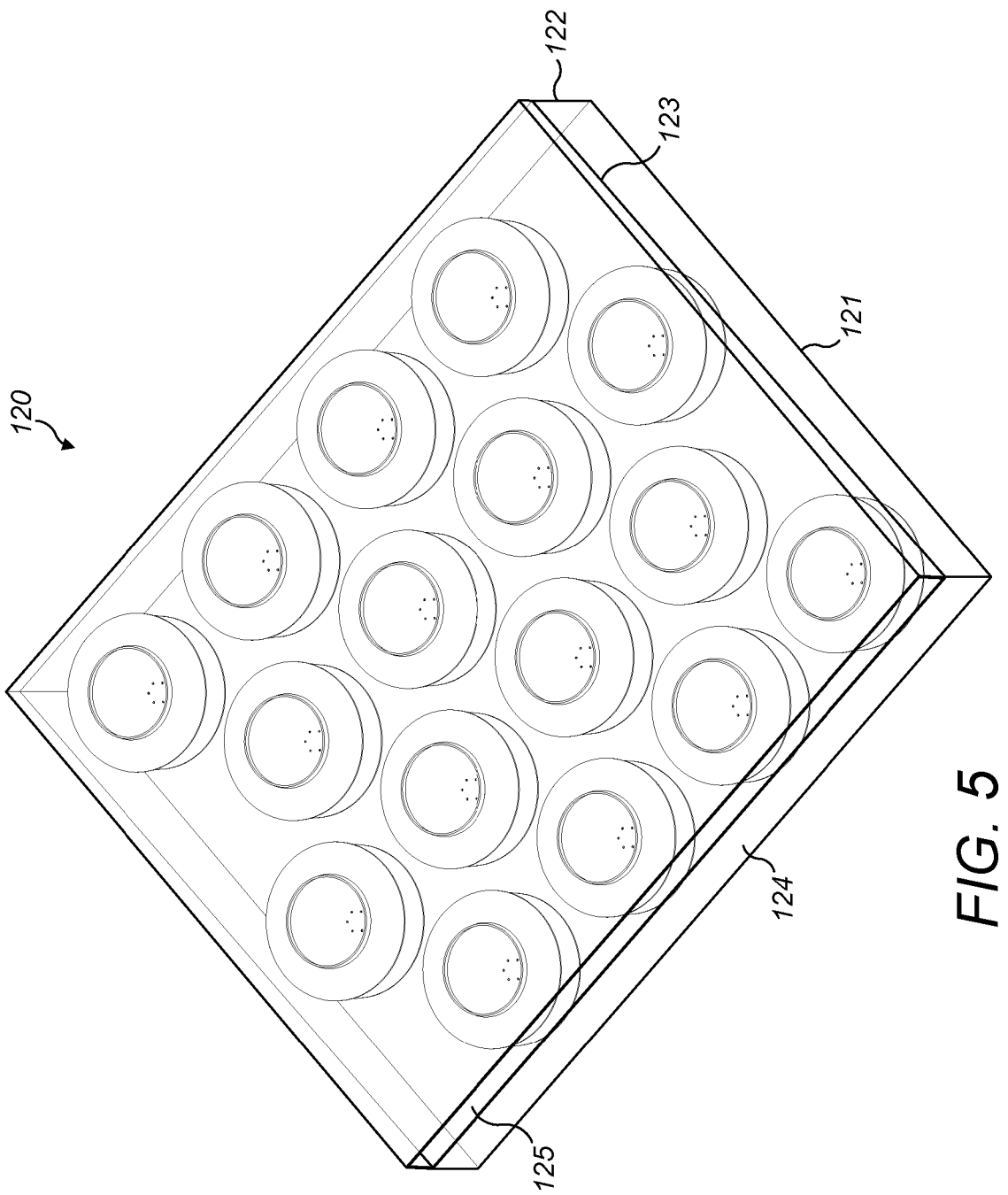
FIG. 5 shows an isometric view of an alternative water harvesting unit arrangement to that shown in FIG. 4.

FIG. 5 discloses a water harvesting unit 120 comprising a chamber 121 having a boundary wall 122 and a partition member 123 which defines a first plenum space 124 located below the partition member 123, and a second plenum space 125 located above the partition member 123. The partition member 123 has a plurality of openings 126 (see FIG. 6) within which are received the lips 9 of a plurality of vessels 10 supported by rotational bearings 27. The bases 11 and the majority of the sidewalls 12 of the vessels 10 are located within the first plenum space 124, and the vessel openings 13 are open to the second plenum space 125.

Although not shown, each of the vessels 10 of the water harvesting unit 120 comprise a hub 18 to facilitate rotation of the vessels 10 in use. A drive assembly (not shown) is provided to drive the rotation of the vessels 10 via the hubs 18. The hubs 18 may be driven by one or more motors located within the chamber 121 or located outside the chamber 121 and connected to the hubs 18 via one or more belt drives.

The chamber 121 further comprises a first airflow opening 128 located in the boundary wall 122 proximate the first plenum space 124 and a second airflow opening 129 located in the boundary wall 122 proximate the second plenum space 125. The first and second airflow openings 128, 129 provide ingress and egress openings for the airflow in use.

Figure 6:
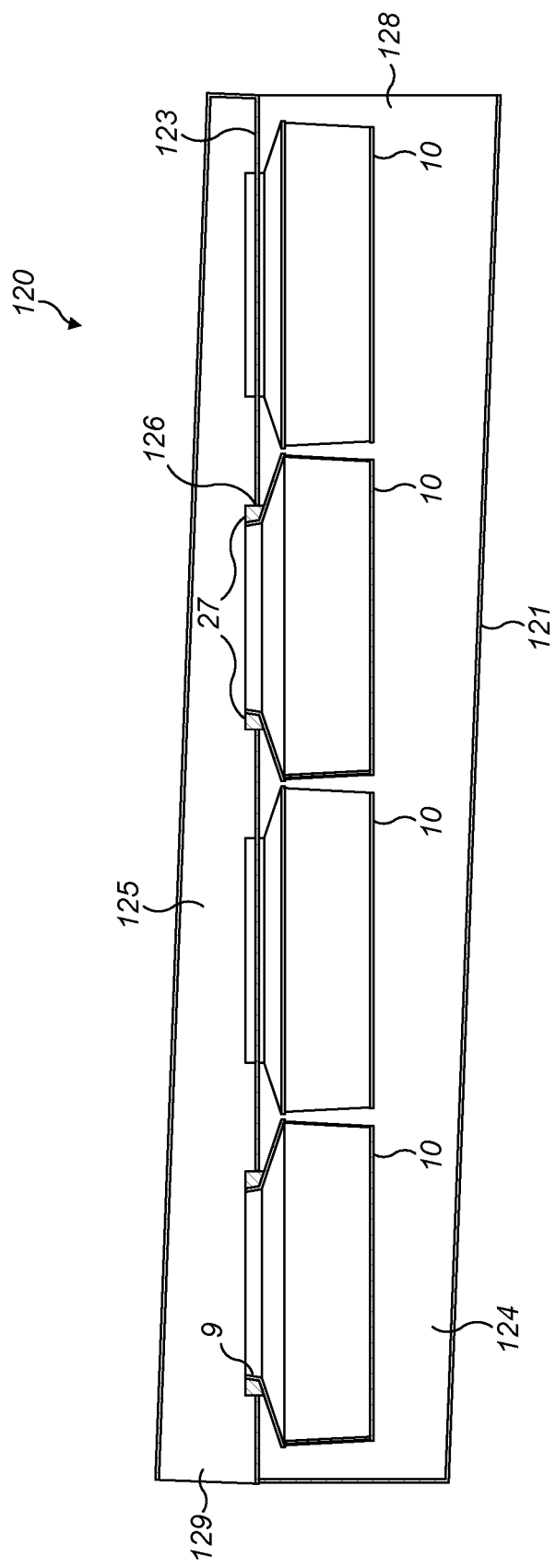
FIG. 6 shows a sectional side view of the water harvesting unit of FIG. 5.

FIG. 6 shows a section side view of the water harvesting unit 120 of FIG. 5. As shown in FIG. 6, the partition member 123 is not parallel to the boundary walls 122 on either side of the plenum spaces 124, 125 such that the first plenum space 124 has a greater cross-sectional area in a direction parallel to the first airflow opening 128 at its inlet end as compared to the opposite closed end of the first plenum space 124. Similarly, the second plenum space 125 has a greater cross-sectional area in a direction parallel to the second airflow opening 129 at its outlet end as compared to the opposite closed end of the second plenum space 125. This configuration helps to ensure that there is a constant pressure drop as is well known in the art of ducting. The airflow through the sidewalls 12 of the vessels 10 in use is therefore substantially consistent between all of the vessels 10.

It will be readily understood that the water harvesting unit 120 of FIGS. 5 and 6 could be used in the water harvesting system 30 of FIG. 4 in place of the water harvesting units 20. Because the water harvesting unit 120 has a plurality of vessels 10 located within one chamber 121 and operated concurrently, the amount of water that may be produced from such a system will exceed the amount of water that can be produced from the system of FIG. 4 since the amount of water produced by the system is directly proportional to the amount of desiccant used.

Figure 7:
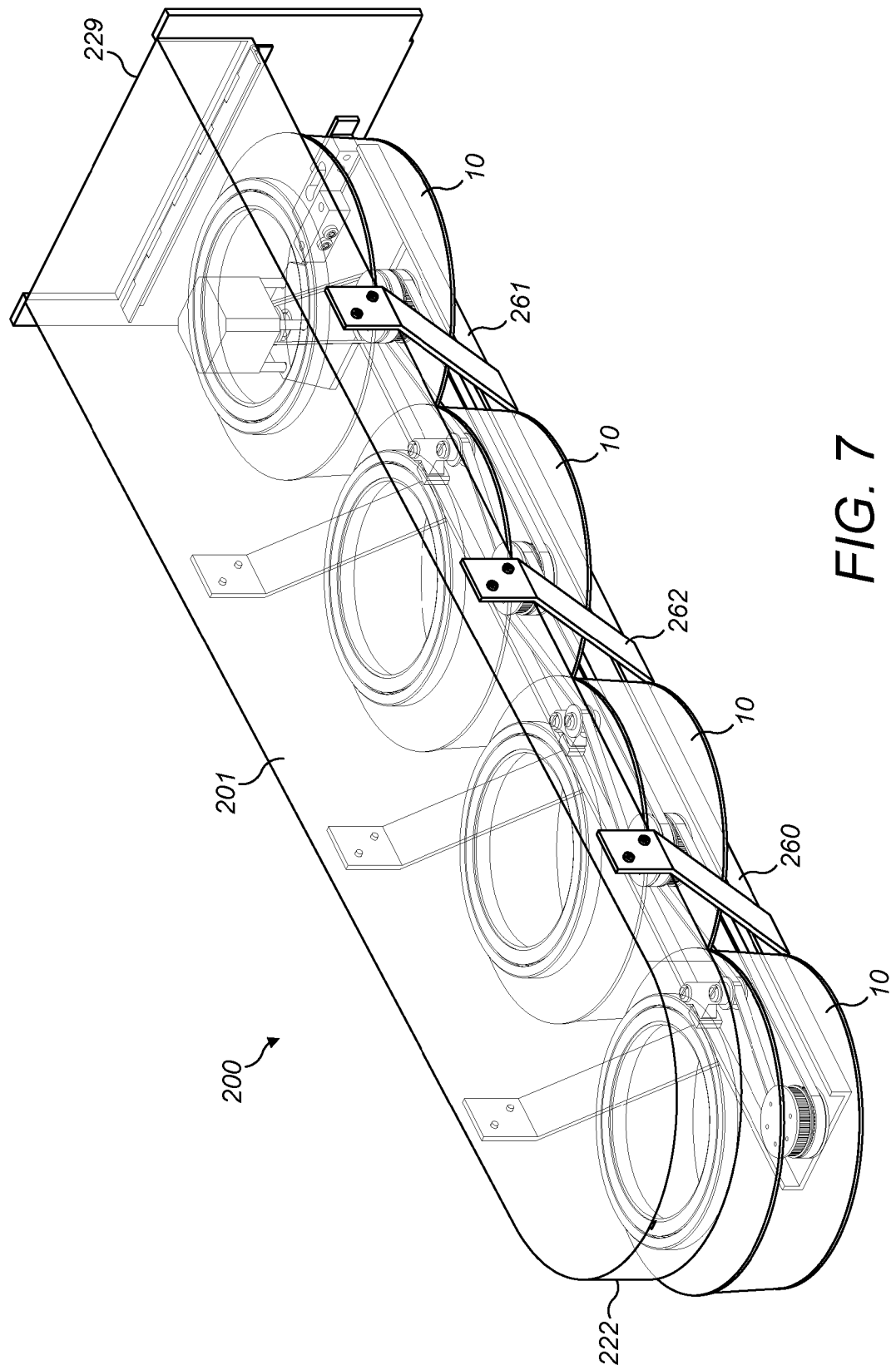
FIG. 7 shows an isometric view of a cassette for a water harvesting unit.
Figure 8:
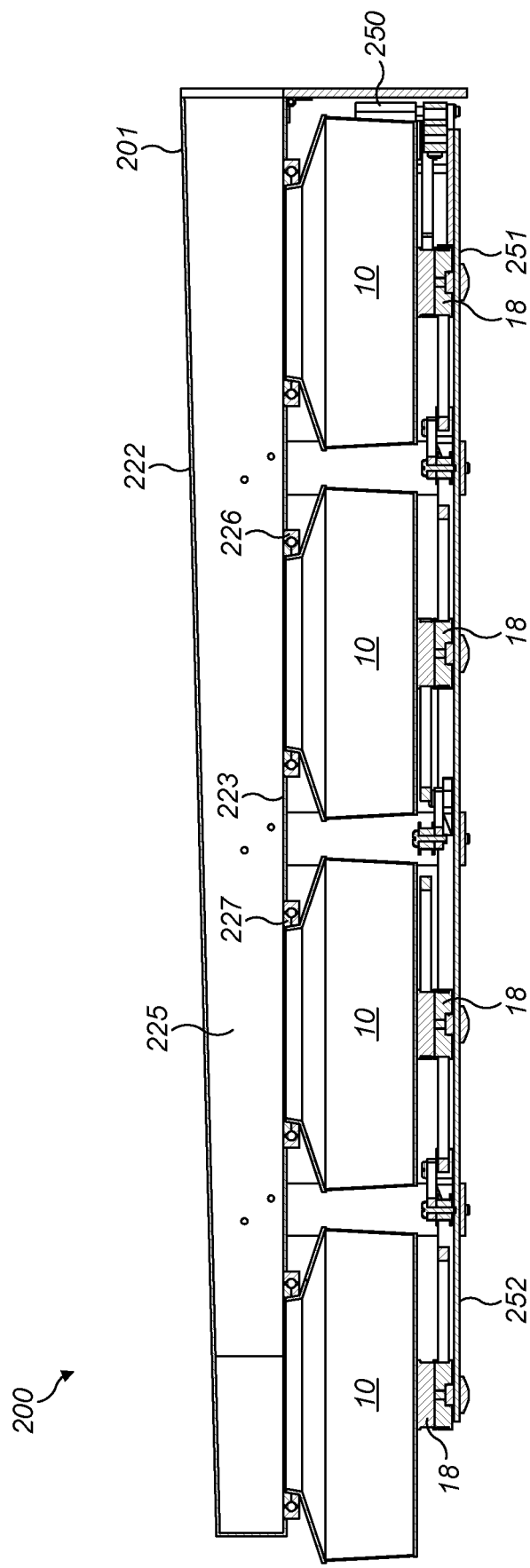
FIG. 8 shows a side view of the cassette of FIG. 7.
Figure 9:
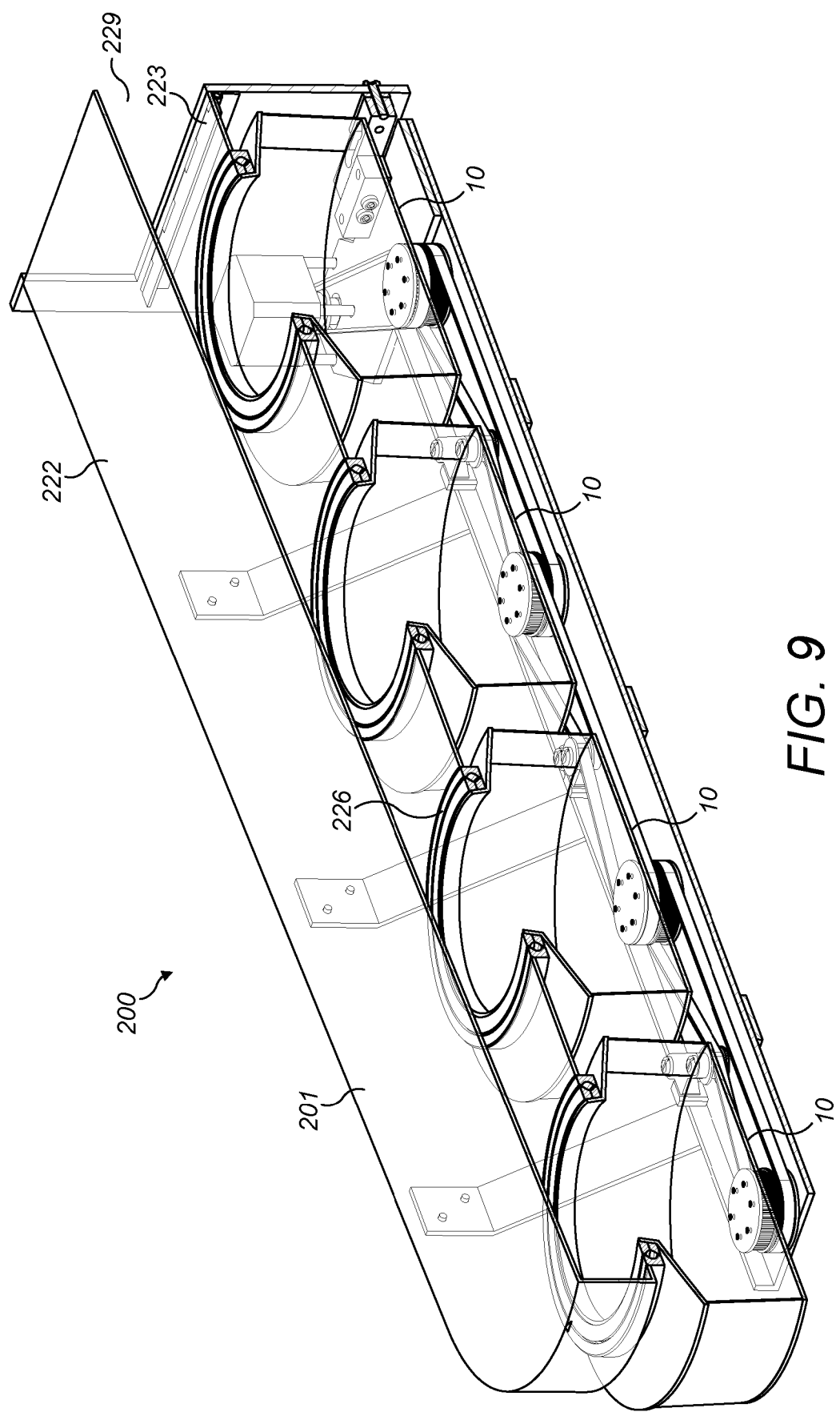
FIG. 9 shows a sectional isometric view of the cassette of FIG. 7.
Figure 10:
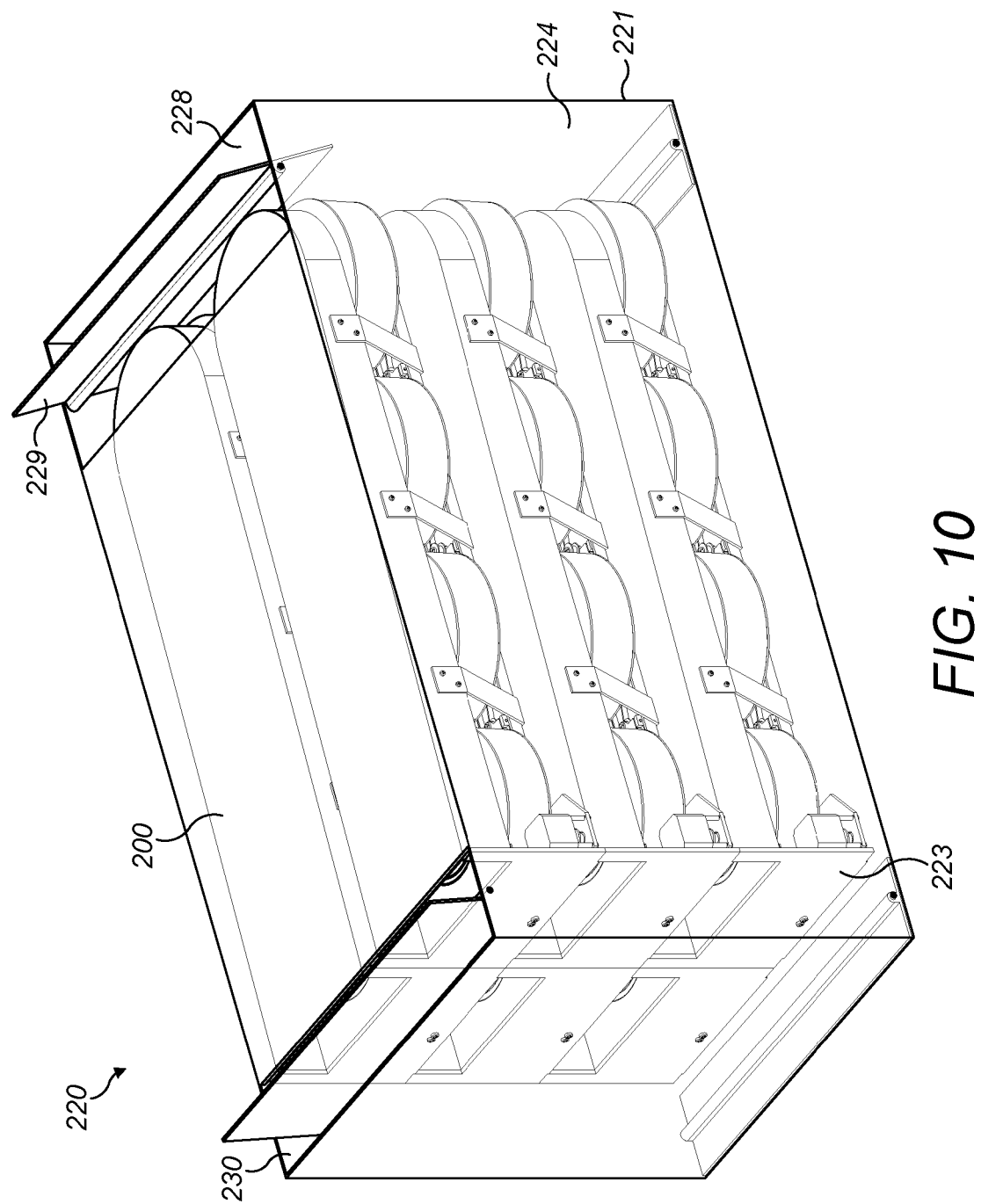
FIG. 10 shows an isometric view of a water harvesting unit comprising a plurality of cassettes.

FIGS. 7 to 9 show a cassette 200 for use in a water harvesting unit 220 (FIG. 10). The cassette 200 comprises an enclosure 201 defining a plenum space 225. The enclosure 201 is bounded by a boundary wall 222 and a partition wall 223 which comprises four partition wall openings 226. The boundary wall 222 also defines an airflow opening 229 (FIG. 9) at one end. The cassette further comprises four vessels 10 each received in one of the partition wall openings 226 and supported for rotation therein by bearings 227.

Each vessel 10 comprises a hub 18 which is connected to a motor 250 by a belt drive 251. The motor 250 and belt drive 251 together form a drive assembly 252 for driving the rotation of the vessels 10 in use. The bases 11 of the vessels 10 are supported by a frame 260 comprising a support beam 261 and side straps 262 which connect the support beam 261 to the boundary wall 222 of the enclosure 201.

Referring to FIG. 10, the water harvesting unit 220 comprises a chamber 221 which defines a first plenum space 224. The chamber 221 is configured to receive six cassettes 200 in a side by side and stacked configuration. It will be understood that any suitable number of cassettes 200 may be received in the chamber 221 and that the cassettes 200 may be configured in any suitable way. For example, the cassettes may be arranged in a single stack or side by side with no stacking. In addition, the airflow openings 229 of the cassettes 200 may be located on different sides of the chamber 221 depending on the particular orientation of any particular cassette with respect to the chamber 221.

In the example of FIG. 10, all of the airflow openings 229 of the cassettes 200 open into a third plenum space 230 defined by the chamber 221 and separated from the first plenum space 224 by a partition wall 231. The cassettes 200 are supported within the chamber 221 by the partition wall 231 and other framework (not shown), When installed in the chamber 221, the vessels 10 of the cassettes 200 are located such that their bases 11 and the majority of their sidewalls 12 are located in the first plenum space 224. The chamber 221 comprises a first airflow opening 228 which allows airflow into the first plenum space 224 in use. Air is directed into the first plenum space 224 by baffle plate 229.

The cassettes 200 may be readily removed and replaced so that the particulate desiccant material 5 may be toped-up or replaced if necessary, or so that broken components may be replaced of fixed. This is beneficial as it allows for rapid maintenance and small amounts of system downtime.

It will be readily understood that the water harvesting unit 220 of FIG. 10 could be used in the water harvesting system 30 of FIG. 4 in place of the water harvesting units 20.

Figure 11A:
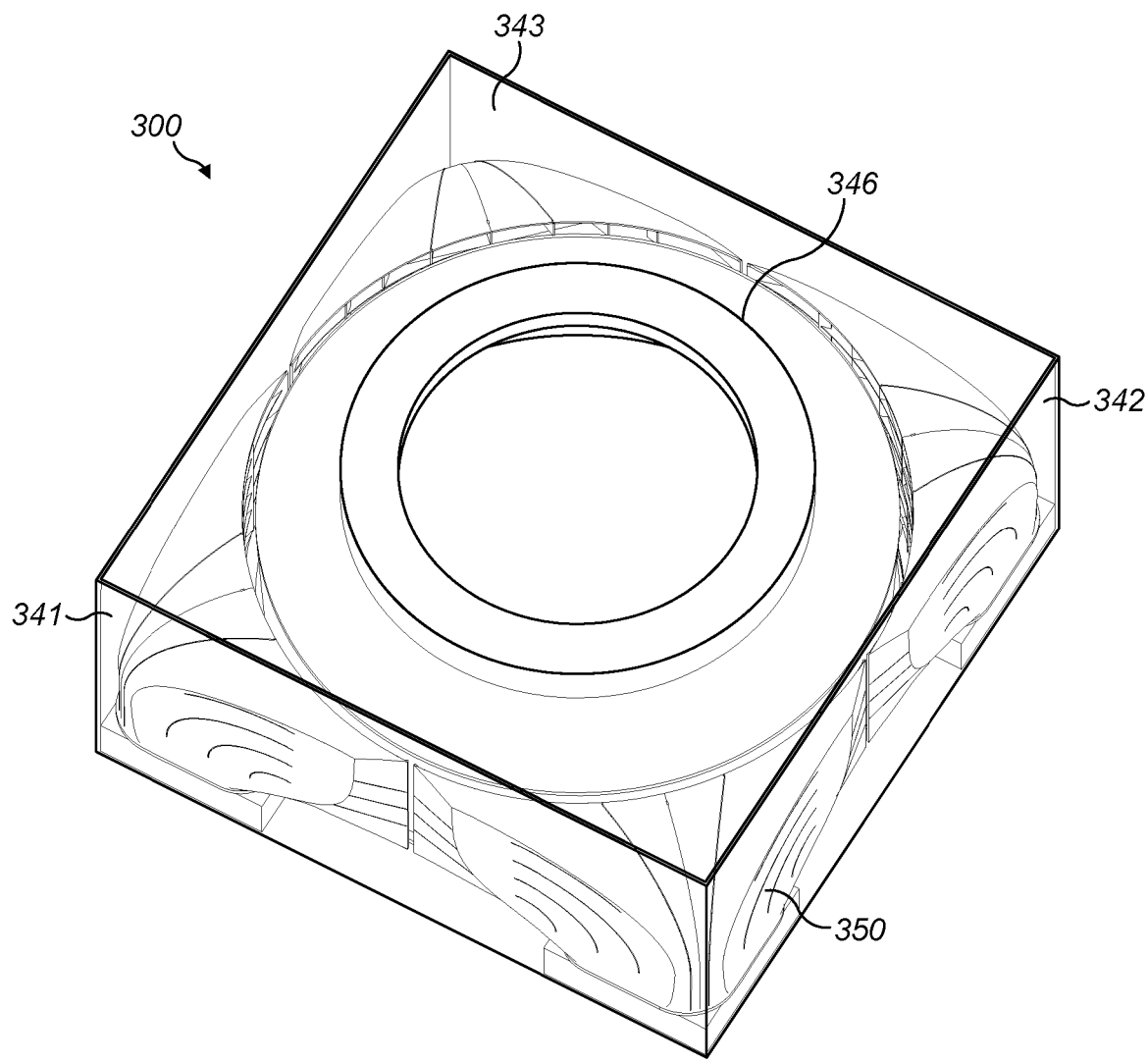
FIG. 11a shows an isometric view of an alternative cassette for a water harvesting unit.
Figure 11B:
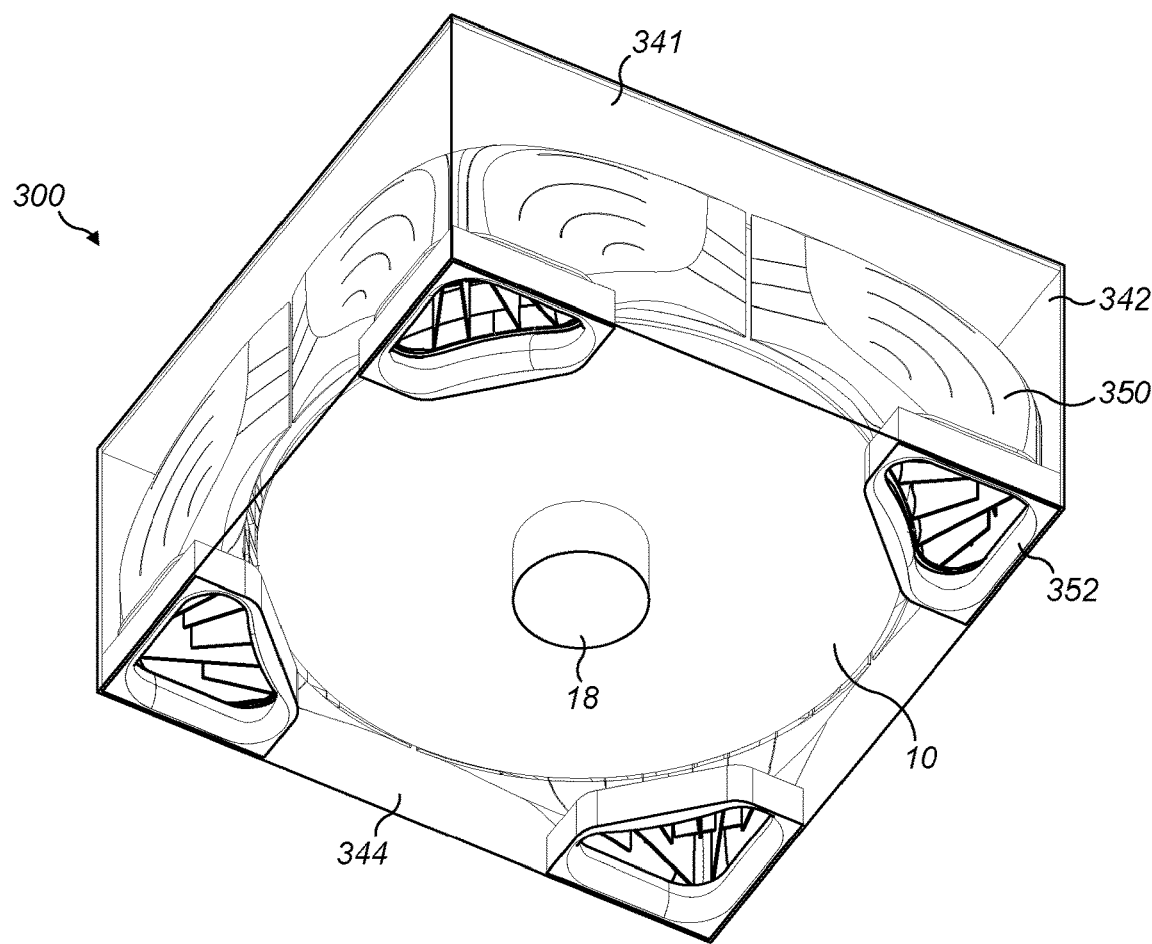
Figure 11C:
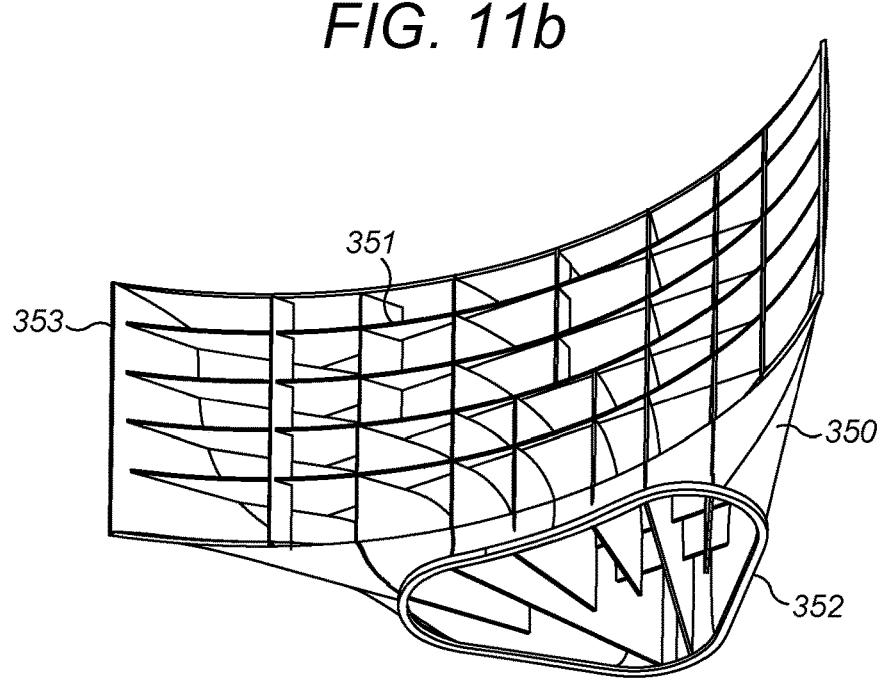
FIG. 11c shows an isometric view of an air funnel for use in the cassette of FIGS. 11a and 11b.

FIGS. 11a and 11b show an isometric view of an alternative water harvesting cassette 300 which comprises a chamber 341 having a boundary wall 342 and a partition member 343 which defines a cassette plenum space 344 located within the boundary wall 342 and below the partition member 343. The partition member 343 has an opening 346 within which is received the lip 9 of a vessel 10 supported by rotational bearings. Hence, the base 11 and the majority of the sidewalls 12 of the vessel 10 are located within the cassette plenum space 344.

The cassettes 300 comprise air funnels 350 located in each corner of the chamber 341. Each air funnel 450 comprises an air inlet 452 and an air outlet 353. The air inlets 352 are located at the lower corners of the chamber 341 and the air outlets 353 are located proximate the first portion 14 of the sidewalls 12 of the vessel 10. The air outlets 353 are configured so that they cover substantially all of one quarter of the first portion 14 of the sidewalls 12. Consequently, when all four air funnels 350 are in place, substantially of the first portion 14 of the sidewalls 12 is covered by a funnel outlet 353.

The air funnels comprise an array of baffles 351 to direct and funnel the airflow from the air inlets 352 to the air outlets 353. It has been found in practice that the provision of air funnels 350 improves the airflow around the vessel 10 to reduce air pressure drop and hence reduce the power requirements of the air blowers. The skilled person will understand that the baffles 351 may be configured differently how shown in FIGS. 11a and 11b.

The air funnels 450 are supported by the boundary wall 342 of the cassette 300. In one embodiment, the base of the cassette 340 below the vessel 10 may comprise a partition wall with openings at each corner to allow air to flow into the air flow openings 452 of the air funnels 450. Alternatively, the base of the cassette 340 may be open.

Figure 12:
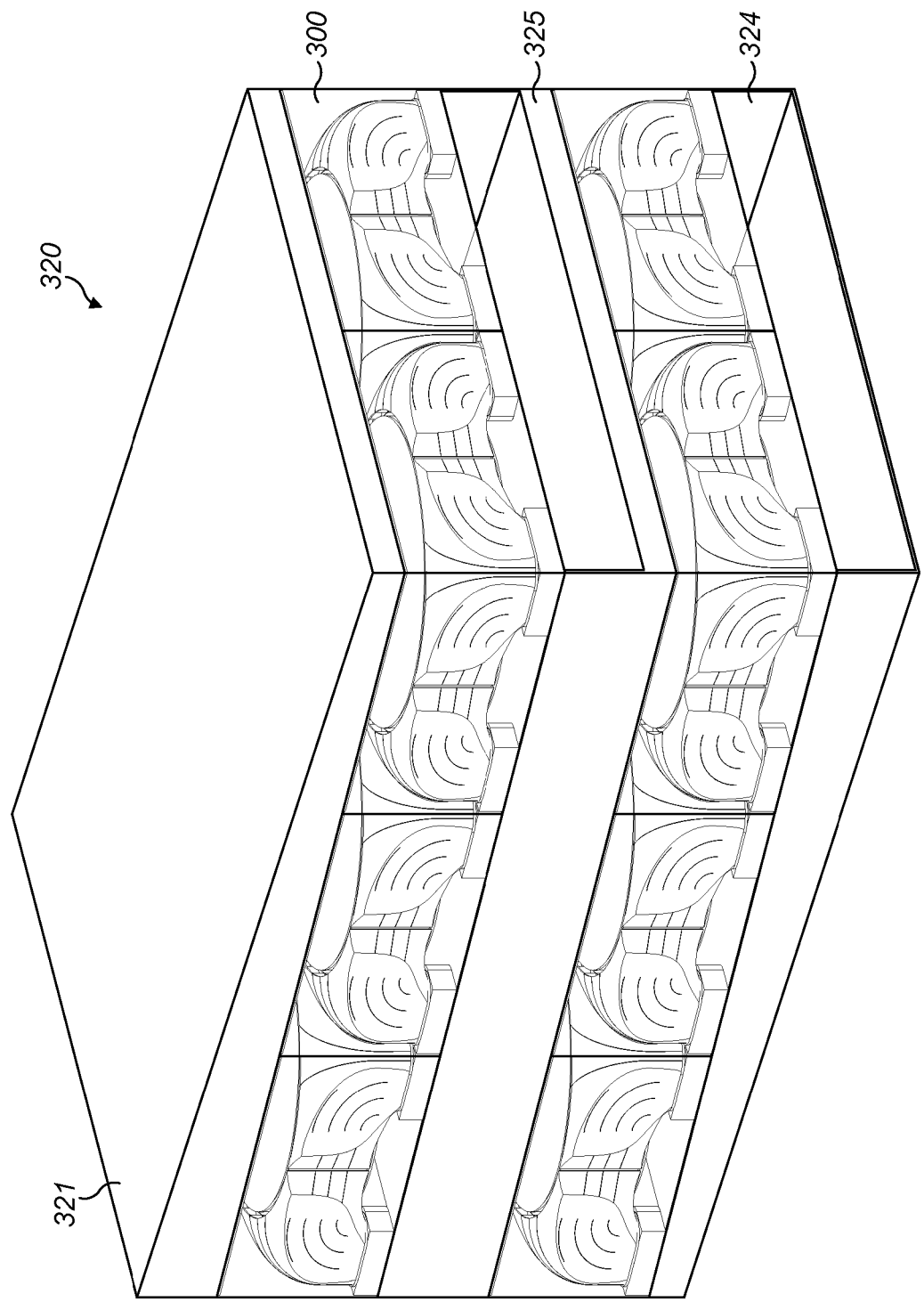
FIG. 12 shows an isometric view of a water harvesting unit comprising a plurality of the water harvesting unit of FIGS. 11a and 11b.

FIG. 12 shows a plurality of the cassettes 300 arranged together in a water harvesting unit 320 which comprises a chamber 321. The cassettes 340 are placed in a stacked array within the chamber 321 so that the cassette plenum spaces 344 are open to first plenum spaces 324 within the chamber 321. The openings 13 of the vessels 10 open into second plenum spaces 325 within the chamber 321. Seals (not shown) are located between the chambers 341 of the cassettes 300 to seal the first plenum spaces 324 from the second plenum spaces 325 within the chamber 321. Although not shown in FIG. 12, the vessels 10 are rotated in use by a drive system acting on the hub 10 of each vessel 10.

In an alternative embodiment, the cassettes 340 may comprise a single partition 343 comprising a plurality of openings 346 within which are received the lips 9 of a corresponding plurality of vessels 10. In this arrangement the boundary walls 342 may be continuous interlinked flat plates. Alternatively, the boundary walls 324 may be omitted entirely in which case, framework is provided to support the air funnels 350.

The water harvesting unit 320 is suitable for use in the water harvesting system 30 of FIG. 4.

The number of water harvesting units 20, 120, 220, 320 or the number of vessels 10 within a water harvesting unit 20, 120, 220, 320 may vary between the adsorption mode of operation and the desorption mode of operation. This may be useful to balance the time taken to run the adsorption mode of operation and the time taken to run the desorption mode of operation. The number of water harvesting units 20, 120, 220, 320 or the number of vessels 10 within a water harvesting unit 20, 120, 220, 320 being used at any one time, in either mode of operation, may be adjustable by the use of appropriate ducting, control valves and controllers.

Figure 13:
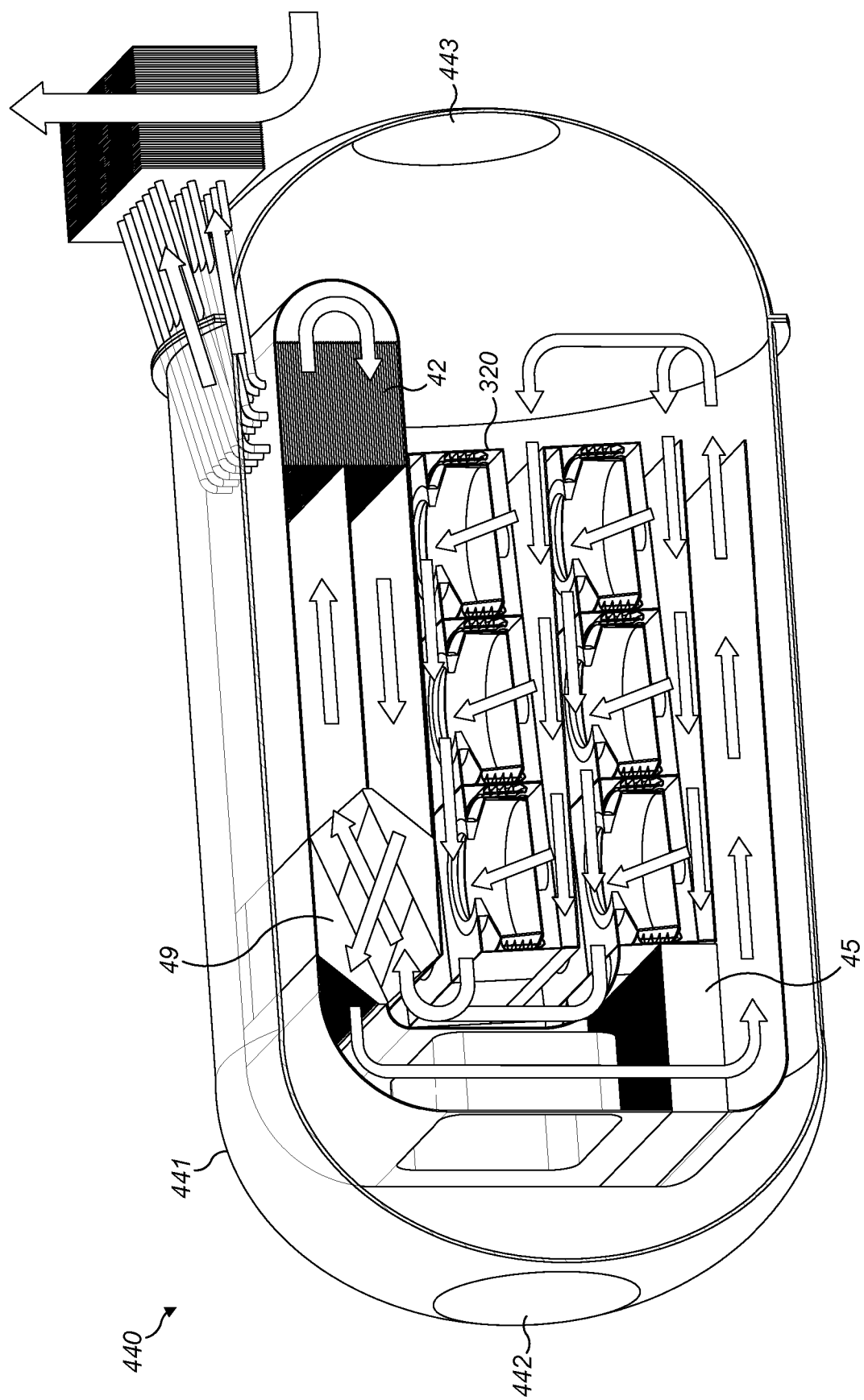
FIG. 13 shows a schematic diagram of a further alternative water harvesting unit operating in an adsorption mode of operation.

FIG. 13 shows a further alternative water harvesting unit 440 operating in a desorption mode of operation. Because the water harvesting system 30 (described above in relation to FIG. 4) uses heat to drive water out of the MOF particles, it is preferable to make the air in the desorption cycle as humid as possible, thereby raising the dewpoint temperature making it possible to condense water from the desorption air flow using ambient air as the cooling medium. This results in elevated water vapour pressure inside the desorption cycle. If the water harvesting unit 320 is not vapour tight, the elevated water vapour pressure inside the water harvesting unit 320 tends to drive the airflow outwardly towards the surrounding ambient air which has a lower water vapour pressure. It is therefore preferable for the water harvesting unit 320 to be vapour tight, or for the water harvesting unit 320 to be located inside a vapour tight vessel.

In order to condense water from the desorption air flow in the desorption cycle it is necessary for there to be a cooling surface at a temperature lower than the dewpoint temperature of the desorption air flow. Because the water harvesting system 30 uses ambient air as the cooling medium, it is necessary for the desorption air flow to have a dewpoint temperature a certain amount higher than the ambient air temperature.

It is known that dewpoint temperature rises with increase pressure. However, there was a concern that elevation of the pressure within the desorption cycle would reduce the desorption performance of the MOF material. Surprisingly, it was ascertained during testing raising the pressure within the desorption cycle did not affect the desorption performance of the MOF material. It was found that a pressure increase of around 2 bar gave a dewpoint temperature increase of around 20°.

The water harvesting unit 440 of FIG. 13 comprises the water harvesting unit 320 of FIG. 12 located inside a pressure vessel 441. The pressure vessel 441 serves two functions, first to ensure a vapour tight environment for the desorption cycle, and second to allow pressurisation if the desorption cycle.

Figure 15:
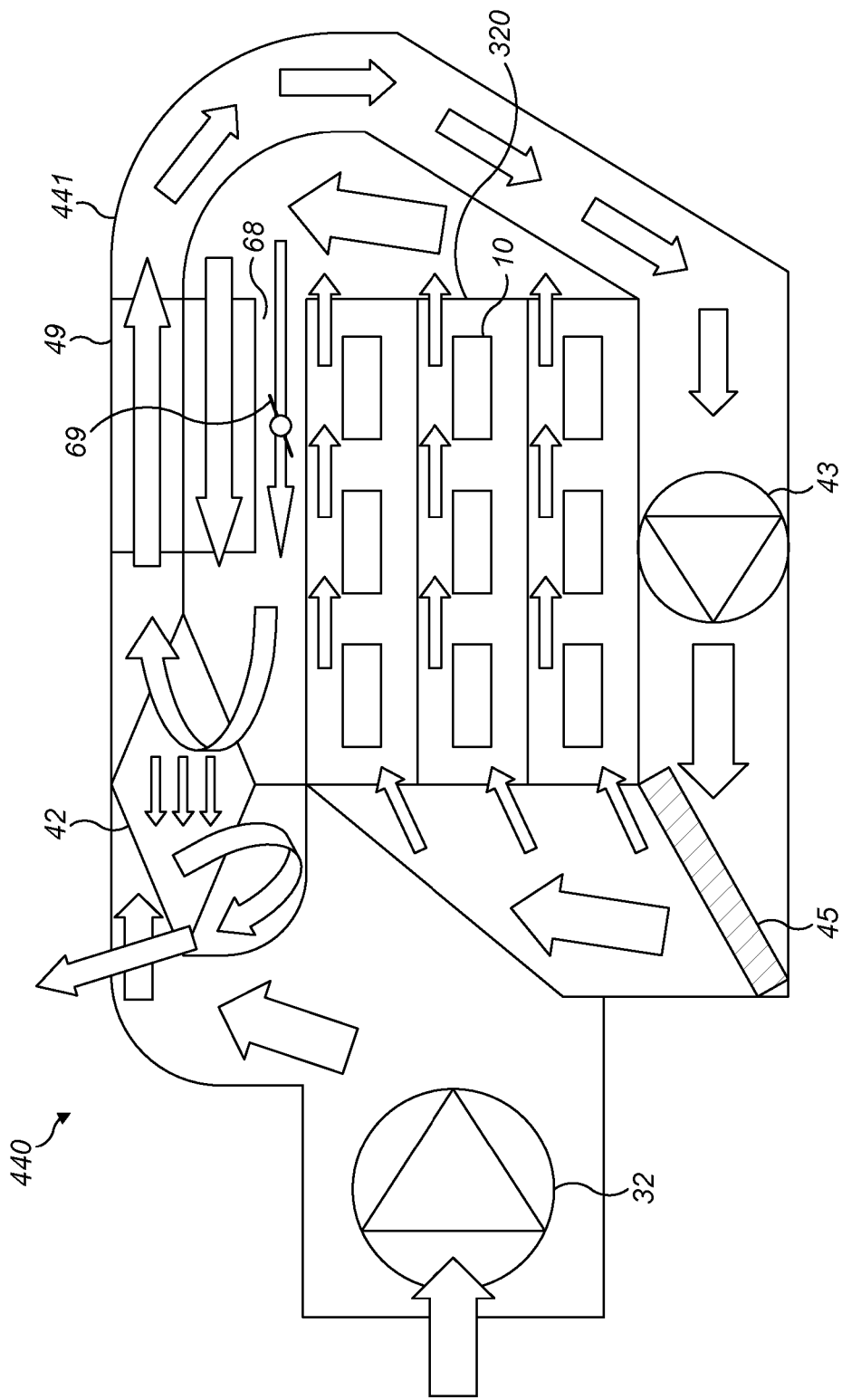
FIG. 15 shows a further schematic version of the water harvesting unit of FIGS. 13 and 14.

The water harvesting system of FIG. 13 is labelled with the same reference numerals as used in FIG. 4 above so that the desorption cycle of the water harvesting system 30 as carried out by the water harvesting unit 440 can be readily understood. A schematic version of the water harvesting unit 440 is also shown in FIG. 15 and marked according the reference numerals of FIG. 4.

Figure 14:
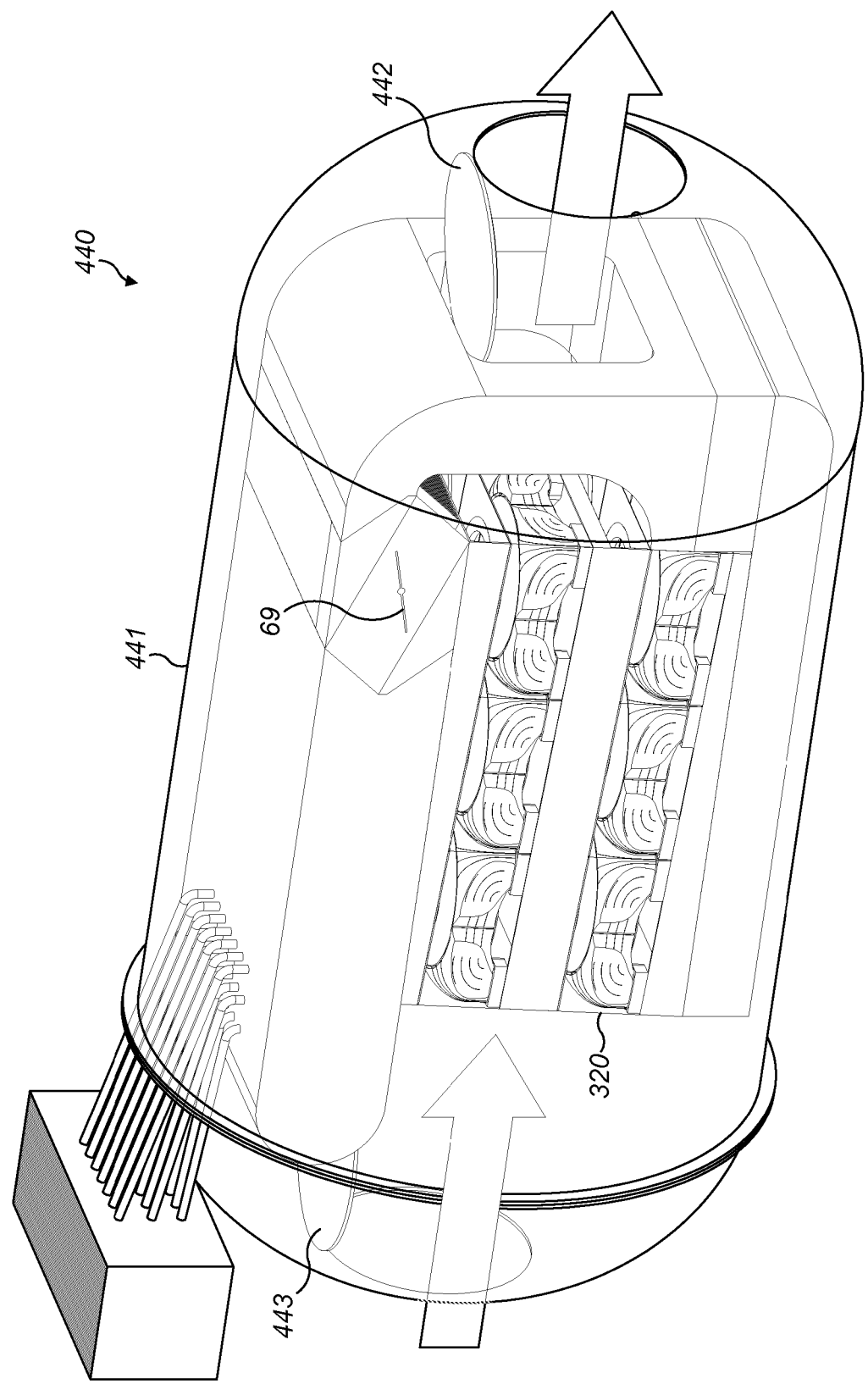
FIG. 14 shows a schematic diagram of the water harvesting unit of FIG. 13 in a desorption mode of operation.

FIG. 14 shows the water harvesting unit 440 of FIG. 13 operating in an adsorption mode of operation. The pressure vessel 441 comprises sealable doors 442, 443 which are opened to allow ambient air from the environment to flow through the pressure vessel and through the water harvesting unit 320 so the water can be absorbed by the MOF material in the vessels 10 of the water harvesting unit 320. Once the MOF material in the vessels 10 is sufficiently saturated with water, the doors are sealed closed so that the desorption cycle may be run.

It will be understood that the water harvesting unit 440 is not limited to use with the water harvesting unit 320 of FIG. 12 and that any of the water harvesting units 20, 120, 220 described above may equally well be used inside a pressure vessel 441.

In the above the vessel(s) 10 have been described with reference to the particular example shown in FIGS. 1 to 3. It will be understood that the vessel(s) 10 could be any suitable shape and configuration and that the vessel(s) 10 is not limited to the specific example described hereinabove. In particular, it will be understood that the sidewalls 12 of the vessel 10 need not be frustoconical, the vessel 10 need not comprises a lip 9 frustoconical or otherwise. In another example (not shown), the base 11 of the vessel 10 by be frustoconical such that it diverges upwardly towards the base of the sidewalls 12.

The vessel 10 may be made from any suitable material capable of supporting the particulate desiccant material 5 and rotating at a speed sufficient to cause the particulate desiccant material 5 for form an annulus 6 adjacent to the sidewalls 12 in use. In addition, the sidewalls 12 of the vessel 10 need not comprise an inner porous layer 17 if the holes 16 are of a sufficiently small size to contain the particulate desiccant material 5. If an inner porous layer 17 is used, it need not be flexible or woven, provided that it is porous.

Finally, although described in the context of a water harvesting operation, it will be clear to a skilled person that the system and method described above could be used in any dehumidification operation such as building air-conditioning systems or dehumidification of chemical gas streams in industrial processes. In addition, it will be understood that the adsorption and desorption airflows may comprise other gases and gas mixes other than air.

The invention claimed is:

1. A water harvesting unit, comprising:
a chamber including a first plenum space and a second plenum space located on either side of a partition member;
a vessel supported for rotation within the chamber, the vessel including a base and a plurality of sidewalls;
wherein the plurality of sidewalls extend from the base to a vessel opening;
wherein the base is substantially fluid impermeable and at least a portion of the plurality of sidewalls are fluid permeable;
wherein the base and a majority of the plurality of sidewalls of the vessel are disposed in the first plenum space; and
wherein the vessel opening is open to the second plenum space via an opening in the partition member.

2. The water harvesting unit as claimed in claim 1, further comprising a charge of particulate desiccant material disposed in the vessel.

3. The water harvesting unit as claimed in claim 1, further comprising at least one air funnel configured to direct air towards the fluid permeable portion of the plurality of sidewalls.

4. The water harvesting unit as claimed in claim 1, further comprising a plurality of vessels supported for rotation in the chamber, wherein the plurality of vessels includes the vessel.

5. The water harvesting unit as claimed in claim 4, wherein:
at least some of the plurality of vessels are offset from one another in a direction parallel to an axis of rotation of the plurality of vessels; and
at least some of the plurality of vessels share a common axis of rotation.

6. A water harvesting system, comprising:
at least one water harvesting unit as claimed in claim 1;
an atmospheric air system including a first air mover configured to supply a flow of atmospheric air to the first plenum space in an adsorption mode of operation;
a desorption air system including a second air mover configured to supply a flow of desorption air to the first plenum space in a desorption mode of operation; and a heat exchanger configured to cool the flow of desorption air leaving the at least one water harvesting unit in the desorption mode of operation such that, in use, at least some water vapour contained in the flow of desorption air condenses within the heat exchanger.

7. The water harvesting system as claimed in claim 6, wherein:
the atmospheric air system further includes an exhaust line configured to convey atmospheric air away from the at least one water harvesting unit; and
the exhaust line is configured to convey at least a part of the atmospheric air flow to the heat exchanger, in use, for use as a coolant.

8. The water harvesting system as claimed in claim 6, wherein the atmospheric air system further includes a chiller arranged upstream of the at least one water harvesting unit with respect to an atmospheric air flow direction in use.

9. The water harvesting system as claimed in claim 6, wherein the desorption air system further includes a closed loop such that, in use, the desorption air flow passes through the at least one water harvesting unit and the heat exchanger before being re-circulated to the first plenum space of the at least one water harvesting unit.

10. The water harvesting system as claimed in claim 9, wherein the desorption air system further includes a recuperative heat exchanger configured to facilitate heat exchange between a desorption air flow exiting the at least one water harvesting unit and a desorption air flow returning to the at least one water harvesting unit.

11. The water harvesting system as claimed in claim 10, wherein the desorption air system further includes a heater arranged upstream of the at least one water harvesting unit and downstream of the recuperative heat exchanger with respect to a direction of desorption air flow in use.

12. The water harvesting system as claimed in claim 6, further comprising a first water harvesting bank and a second water harvesting bank, wherein:
the at least one water harvesting unit includes a plurality of water harvesting units;
the first water harvesting bank includes a first subset of the plurality of water harvesting units;
the second water harvesting bank includes a second subset of the plurality of water harvesting units; and
in use, when one of the first water harvesting bank and the second water harvesting bank is operating in an adsorption mode of operation, the other of the first water harvesting bank and the second water harvesting bank is operable in a desorption mode of operation.

13. A method of harvesting water from atmospheric air, the method comprising:
passing a flow of atmospheric air through a rotating vessel, the vessel including a base and a plurality of sidewalls, the plurality of sidewalls extending from the base to a vessel opening, wherein the base is substantially fluid impermeable and at least a portion of the plurality of sidewalls are fluid permeable, the vessel further including a charge of particulate desiccant material disposed therein, wherein passing the flow of atmospheric air through the rotating vessel includes passing the flow through the plurality of sidewalls of the rotating vessel from an exterior of the vessel to an interior of the vessel, wherein the flow of atmospheric air exits the vessel via the vessel opening;
stopping the flow of atmospheric air through the rotating vessel;
passing a flow of desorption air through the rotating vessel, wherein passing the flow of desorption air through the rotating vessel includes passing the flow through the plurality of sidewalls of the rotating vessel from the exterior of the vessel to the interior of the vessel, wherein the flow of desorption air exits the vessel via the vessel opening; and
cooling the flow of desorption air exiting the vessel to recover liquid water from the flow of desorption air.

14. The method of harvesting water from atmospheric air as claimed in claim 13, further comprising chilling the flow of atmospheric air before passing it through the vessel.

15. The method of harvesting water from atmospheric air as claimed in claim 13, further comprising heating the flow of desorption air before passing it through the vessel.

16. The method of harvesting water from atmospheric air as claimed in claim 13, wherein the flow of desorption air includes a closed loop flow such that the flow of desorption air circulates around a closed loop.

17. The method of harvesting water from atmospheric air as claimed in claim 16, further comprising using the flow of desorption air exiting the vessel to heat a returning flow of desorption air before it re-enters the vessel.

18. The method of harvesting water from atmospheric air as claimed in claim 13, further comprising passing a flow of atmospheric air through a first rotating vessel at the same time as passing a flow of desorption air through a second rotating vessel.

19. The method of harvesting water from atmospheric air as claimed in claim 18, further comprising using the flow of atmospheric air exiting the first vessel to cool the flow of desorption air exiting the second vessel.

20. The method of harvesting water from atmospheric air as claimed in claim 18, further comprising:
stopping the flow of atmospheric air through the first rotating vessel;
stopping the flow of desorption air through the second rotating vessel; and
passing a flow of atmospheric air through the second rotating vessel at the same time as passing a flow of desorption air through the first rotating vessel.

\* \* \* \* \*